United States Patent
Yiu et al.

(10) Patent No.: US 10,243,704 B2
(45) Date of Patent: Mar. 26, 2019

(54) SIGNALLING FOR PER CARRIER-COMPONENT BASED ENHANCED MEASUREMENT GAP CONFIGURATION

(71) Applicant: Intel IP Corporation, Santa Clara, CA (US)

(72) Inventors: Candy Yiu, Portland, OR (US); Yang Tang, Pleasanton, CA (US); Rui Huang, Beijing (CN); Youn Hyoung Heo, Seoul (KR); Hong He, Beijing (CN)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/553,071

(22) PCT Filed: Apr. 8, 2016

(86) PCT No.: PCT/US2016/026729
§ 371 (c)(1),
(2) Date: Aug. 23, 2017

(87) PCT Pub. No.: WO2016/164782
PCT Pub. Date: Oct. 13, 2016

(65) Prior Publication Data
US 2018/0034598 A1 Feb. 1, 2018

Related U.S. Application Data

(60) Provisional application No. 62/294,867, filed on Feb. 12, 2016, provisional application No. 62/145,318, filed on Apr. 9, 2015.

(51) Int. Cl.
*H04L 5/00* (2006.01)
*H04W 24/10* (2009.01)
(Continued)

(52) U.S. Cl.
CPC .............. *H04L 5/001* (2013.01); *H04L 12/28* (2013.01); *H04W 24/10* (2013.01);
(Continued)

(58) Field of Classification Search
CPC ........ H04L 5/001; H04L 12/28; H04W 24/10; H04W 36/0094; H04W 52/0216
See application file for complete search history.

(56) References Cited

U.S. PATENT DOCUMENTS

2010/0304748 A1* 12/2010 Henttonen ........ H04W 36/0077
455/436
2011/0199908 A1* 8/2011 Dalsgaard ............. H04W 24/10
370/241
(Continued)

FOREIGN PATENT DOCUMENTS

WO 2014/098538 A1 6/2014

OTHER PUBLICATIONS

International Search Report dated Jul. 18, 2016 for International Application PCT/US2016/026729.
(Continued)

*Primary Examiner* — Chi H Pham
*Assistant Examiner* — Weibin Huang
(74) *Attorney, Agent, or Firm* — Eschweiler & Potashnik, LLC

(57) ABSTRACT

A network device (e.g., an evolved Node B (eNB) or user equipment (UE)) can process or generate a measurement gap pattern to enable network measurements of carriers or bands during measurement gaps on a per component carrier (CC) basis. The transmitting or receiving of the measurement objects (e.g., carriers or band) communicatively coupled on the network and the measurement gap pattern can be communicated via one or more radio resource control (RRC) signals, and re-configured according to a supporting CC data
(Continued)

set identifying one or more criteria related to each CC such as UE capabilities, associations of the UE capabilities to measurement gap configurations, types of measurement gap period/gap offsets, different measurement gap patterns, an absence of a measurement gap, or other criteria related to CCs, respectively. In response to the supporting CC data set, measurement gap patterns can be dynamically re-configured per CC.

18 Claims, 24 Drawing Sheets

(51) Int. Cl.
*H04L 12/28* (2006.01)
*H04W 36/00* (2009.01)
*H04W 52/02* (2009.01)
*H04W 72/12* (2009.01)

(52) U.S. Cl.
CPC ... *H04W 36/0094* (2013.01); *H04W 52/0216* (2013.01); *H04W 72/12* (2013.01)

(56) References Cited

U.S. PATENT DOCUMENTS

| | | | |
|---|---|---|---|
| 2011/0274007 A1 | 11/2011 | Lin et al. | |
| 2013/0016690 A1* | 1/2013 | Jeong | H04W 24/10 370/329 |
| 2014/0341192 A1* | 11/2014 | Venkob | H04L 5/001 370/336 |
| 2017/0339714 A1* | 11/2017 | Harada | H04J 11/00 |

OTHER PUBLICATIONS

"Discussion about Measurement Gap Handling." Agenda Item 7.1.1. Source ITRI. 3GPP TSG-RAN WG2 Meeting #72bis, Dublin, Ireland, Jan. 17-21, 2011. Tdoc R2-110357. 3 pages.

* cited by examiner

1700

| Band | Gap needed? |
|---|---|
| $CC_1$ | Yes |
| $CC_2$ | No |
| $CC_3$ | Yes |
| .... | ... |
| $CC_i$ | Yes |
| .... | ... |
| $CC_{32}$ | No |

| Band | Gap? |
|---|---|
| $CC_1$ | Long |
| $CC_2$ | No |
| $CC_3$ | Short |
| …, | … |
| $CC_i$ | Long |
| …, | … |
| $CC_{32}$ | No |

| CC index | Gap? Configuration |
|---|---|
| $CC_1$ | x |
| $CC_2$ | y |
| $CC_3$ | z |
| ... | ... |
| $CC_i$ | x |
| ... | ... |
| $CC_{32}$ | No gap |

FIG. 19

SIGNALLING FOR PER CARRIER-COMPONENT BASED ENHANCED MEASUREMENT GAP CONFIGURATION

REFERENCE TO RELATED APPLICATIONS

This application is a National Phase entry application of International Patent Application No. PCT/US2016/026729 filed Apr. 8, 2016, which claims priority to U.S. Provisional Application No. 62/145,318, filed Apr. 9, 2015 and U.S. Provisional Application No. 62/294,867 filed on Feb. 12, 2016, the contents of which are herein incorporated by reference in their entirety.

FIELD

The present disclosure relates to measurement gaps, and more specifically, cell specific group measurement gap patterns on a per carrier-component basis.

BACKGROUND

Wireless mobile communication technology uses various standards and protocols to transmit data between a node (e.g., a transmission station) and a wireless device (e.g., a mobile device), or a user equipment (UE). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the UE. The downlink (DL) transmission can be a communication from an access point/node or base station (e.g., a macro cell device, an eNodeB, an eNB, or other similar network device) to the UE, and the uplink (UL) transmission can be a communication from the wireless device to the node. In LTE, data can be transmitted from the eNodeB to the UE via a physical downlink shared channel (PDSCH). A physical uplink control channel (PUCCH) can be used to acknowledge that data was received. Downlink and uplink channels can use time-division duplexing (TDD) or frequency-division duplexing (FDD).

Future network deployments ensure that the number of frequencies is going to increase as a result of higher demand and newer technology evolving in wireless communication. The number of cells and frequency demand are almost certain to increase. Macro cell network devices, small cell network devices or the other such network devices having a smaller coverage zone or lower power capability than a macro cell device (e.g., small eNBs, micro-eNBs, pico-eNBs, femto-eNBs, home eNBs (HeNBs)) can also be introduced with dual connectivity features as specified in 3GPP Release 12. The user equipment (UE) (e.g., a network device, a mobile device, a wireless device or the like) can thus be capable of connecting two or more cells simultaneously.

In order to facilitate smooth network transitions (e.g., cell handovers, redirection, reselection, or the like)) with high a quality of experience (QoE), the UE has to have the capability to measure surrounding cells and provide related data to the network. In network deployment situations there may be many frequencies, some of the frequency carriers can be micro cells that have been deployed back to back in dense network deployments. However, the UE may not be able to switch to those cells as a result of a large load within the macro cell, for example. As a result of a large network deployment density, the UE may not be able to access these small cells depending on the location of the UE. If the UE misses chances of measuring small cell frequency carriers, it might not have a backup network available. Additionally, if it misses measurements to the macro layers, the UE may not be able to handover fast enough and a call could drop.

BRIEF DESCRIPTION OF THE DRAWINGS

FIGS. 17-20 illustrate an example CC data set(s) or supporting band list(s) for indicating one or more measurement gap configurations according to various aspects or embodiments being disclosed.

DETAILED DESCRIPTION

Figure 1:
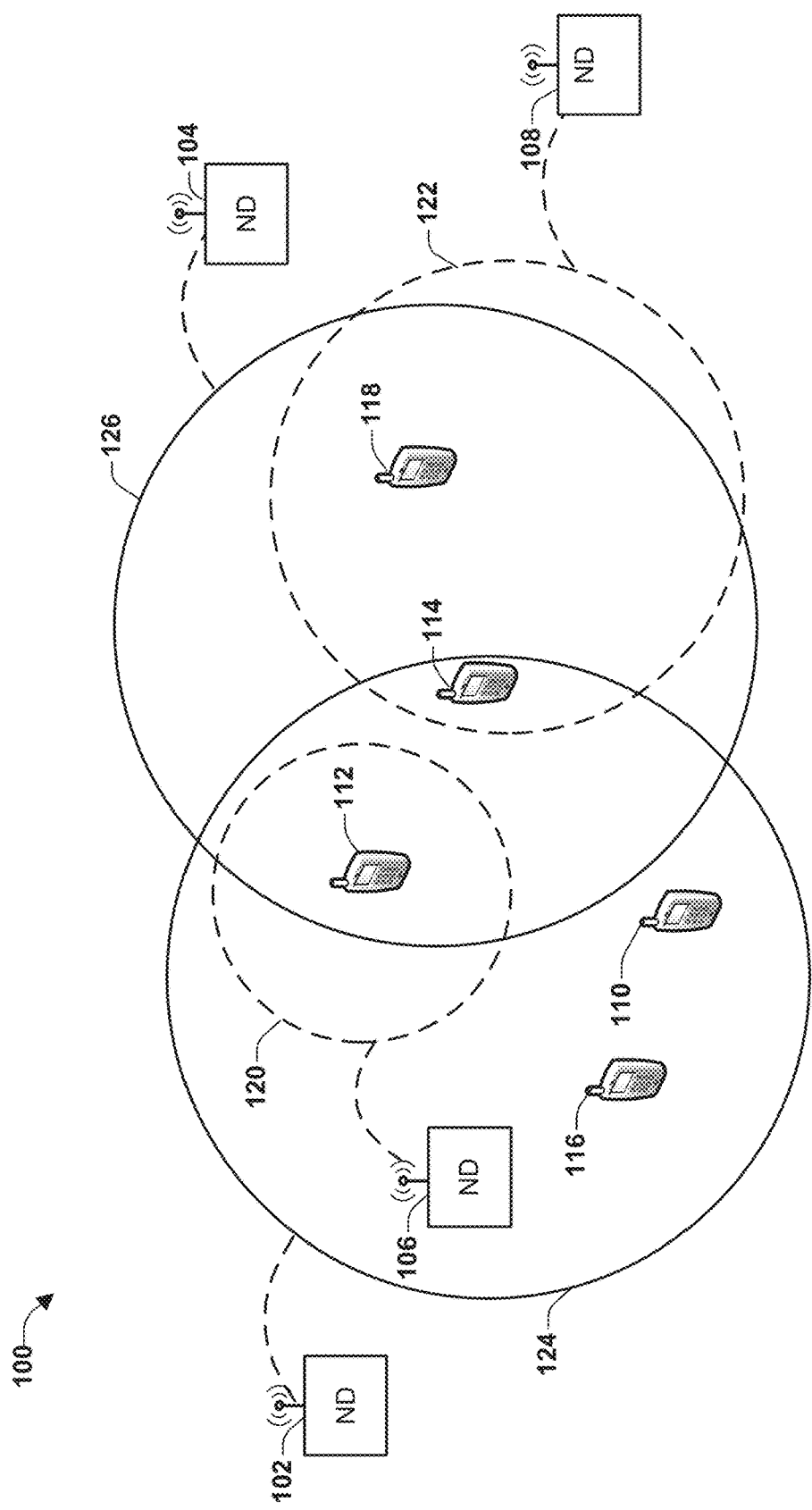
FIG. 1 illustrates a block diagram illustrating an example wireless communications network environment for a UE or eNB according to various aspects.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, a circuit or a circuit element, an object, an executable, a program, a storage device, a computer, a tablet PC and/or a mobile phone with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components or elements without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

In consideration of the above described deficiencies, network devices (e.g., macro cells, Access Points (APs), Access Controllers (ACs), eNBs, small cells, UEs, etc.) described herein can enable one or more specific measurement gap patterns and related solutions to support LTE carrier aggregation (CA) of up to 32 carrier components (CCs) for DL and UL. For CA processes, two measurement performance groups alone may not be enough for the LTE CA to support up to 32 CCs or more. Various measurement gap patterns are proposed in this disclosure to more efficiently measure carriers at the measurement gaps based on a per component carrier (CC) basis, or according to particular CCs being measured as part of a measurement gap pattern.

A measurement gap pattern can be referred to as the pattern of measurement gaps that the UE can facilitate frequency carrier (e.g., CC) measurements on within a time period or duration. The UE, for example, can operate during a measurement gap to switch from a serving band it is connected on to a different band (or CC) in order to perform a measurement of the (component) carrier. The term serving band as used herein means the UE can be connected to that band as a serving band to receive downlink data on, in this case no measurement is necessarily required in that band because the UE is already operating in or on that band.

In some aspects herein, the UE can receive an RRC communication with measurement gap configuration data for a particular measurement gap pattern to be implemented by the UE. The UE can respond to the RRC communication from an eNB in order to provide an indication back to the eNB for a modification of the measurement gap pattern on a per CC basis. For example, the UE can responds to the RRC communication with a supporting CC data set or band list that provides UE capabilities, such as CC coverage capabilities related to particular communication chains (transmit or receive circuitry paths) as well as various criteria specifying parameters of the measurement gap pattern. In response to the UE feedback, the eNB can then re-configure the particular measurement gap patter based on UE capabilities or feedback for one or more measurement gap pattern parameters or variables discussed herein. The UE can then re-configure how, when and in what manner measurement gap patterns are implemented with different re-configuration data provided by the eNB. Additional aspects and details of the disclosure are further described below with reference to figures.

FIG. 1 illustrates an example non-limiting wireless communications environment 100 that can facilitate or enable one or more measurement gap configurations via communications between the base station network device (e.g., eNB) and UEs for LTE CA to support an increased number of frequency carriers or carrier components. The wireless communications environment 100 can include a multitude of wireless communications networks, each having a respective coverage area. The coverage area of some of the wireless communications networks can overlap such that one or more mobile devices might be served by any one of the network devices whose coverage areas overlap.

Wireless communications environment 100 includes one or more cellular broadcast servers or macro cell network devices 102, 104 (e.g., base stations, eNBs, access points (APs) or the like) and one or more small cell network devices or APs (e.g., small eNBs, micro-eNBs, pico-eNBs, femto-eNBs, home eNBs (HeNBs), or Wi-Fi nodes) 106, 108 deployed within the wireless communications environment 100 and servicing one or more UE devices 110, 112, 114, 116, 118. Each wireless communications network (e.g., cellular broadcast servers 102, 104 and small cell network devices 106, 108) can comprise one or more network devices (e.g., a set of network devices (NDs)) that operate in conjunction in order to process network traffic for the one or more UE devices 110, 112, 114, 116, or 118. For example, macro cell NDs 102, 104 can comprise a set of network devices that are cellular enabled network devices. In another example, the small cell network devices 106, 108 can include a set of network devices that operate with a smaller coverage zone than the macro cell network devices 102 and 102, for example.

Although NDs 106 and 108 are described as small cell network devices, they can also be Wi-Fi enabled devices or wireless local area network (WLAN) devices, as well as macro cell network devices, small cell network devices, or some other type of ND operable as a base station, eNB, or secondary cell network device for example. Alternatively one or more of the macro cell NDs 102 and 104 could be small cell network devices or other NDs of a different radio access technology (RAT) that operate with different frequency carriers, for example.

As illustrated, each of the one or more Wi-Fi access points 106, 108 can have a corresponding service area 120, 122. Additionally, each of the one or more cellular broadcast servers or macro cell NDs 102, 104 can have a corresponding service area 124, 126. However, it should be understood that the wireless communications environment 100 is not limited to this implementation. For example, any number of APs or NDs with respective service areas can be deployed within the wireless communications environment 100. Further, any number of cellular broadcast servers and respective service areas can be deployed within the wireless communications environment 100 as well.

Although only five UE devices 110, 112, 114, 116, 118 are illustrated, any number of UE devices can be deployed within the wireless communications environment 100 as well. A UE device can contain some or all of the functionality of a system, subscriber unit, subscriber station, mobile station, mobile, wireless terminal, device, mobile device, remote station, remote terminal, access terminal, user terminal, terminal, wireless communication device, wireless communication apparatus, user agent, user device, or other ND, for example. A mobile device can be a cellular telephone, a cordless telephone, a Session Initiation Protocol (SIP) phone, a smart phone, a feature phone, a wireless local loop (WLL) station, a personal digital assistant (PDA), a laptop, a handheld communication device, a handheld computing device, a netbook, a tablet, a satellite radio, a data card, a wireless modem card and/or another processing device for communicating over a wireless system. In addition, the UE devices 110, 112, 114, 116, 118 can include functionality as more fully described herein and can also be configured as dual connected devices, in which one or more of the UE devices 110, 112, 114, 116, 118 can be connected to more than one eNB or ND of different RATs (e.g., LTE and WLAN, or other combination).

In one aspect, cellular broadcast servers or macro cell NDs 102, 104 and small cell NDs 106, 108 can monitor their surrounding radio conditions (e.g., by employing respective measurement components). For example, each of the macro cell NDs 102, 104 and small cell NDs 106, 108 can determine network traffic load on its respective network by performing a network diagnostic procedure. As an example, during a network listen procedure, macro cell NDs 102, 104, small cell NDs 106, 108 or UE devices 110, 112, 114, 116, 118 can scan their radio environment to determine network performance statistics or network parameters (e.g., frequency, SNR, signal quality, QoS, QoE, load, congestion, signal rate, etc.). Various parameters associated with macro cell NDs 102, 104 and small cell NDs 106, 108 can be detected during the network diagnostic procedure or measurements by the UE devices, such as, but not limited to, frequency bands, scrambling codes, common channel pilot power, bandwidth across respective networks, universal mobile telecommunications system terrestrial radio access receive signal strength indicator, as well as frequency carrier priorities for particular cell groups (e.g., a normal group or a reduced group) and so on.

In an example scenario, UE devices 110, 112, 114, 116, 118 can be serviced by networks through one of the macro cell NDs 102, 104, or small cell NDs 106, 108. As a user equipment device is moved within the wireless communications environment 100, the respective user equipment device might be moved in and out of the coverage area of the associated serving network. For example, as a user is sending/receiving communications through their respective UE device, the user might be walking, riding in a car, riding on a train, moving around a densely populated urban area (e.g., a large city), wherein the movement might cause the mobile device to be moved between various wireless communication networks. In such cases, the UE it is beneficial to route the network traffic (e.g., handoff) from a serving ND to a target ND in order to continue the communication (e.g., avoid dropped calls) or facilitating offloading for load distribution or other efficiency purposes. However, with an increased number of NDs and frequency carriers to measure, UE devices 110, 112, 114, 116, 118 can have a problem being able to measure each carrier within allotted time measurement gaps. Because the UE devices 110, 112, 114, 116, 118 have to measure an increase number if carriers (e.g., 32 or greater), these measurement gaps can introduce more delays.

In one example, if two frequency carriers (e.g., carrier components (CCs) for LTE CA) of different frequencies exist on the network environment 100, where 40 milliseconds (ms) can be the measurement gap, for example, or some other gap, such as 40 ms, 80 ms, or other gap, for example. Because there are two CCs or more, for example, when supporting carrier aggregation, the UE devices 110, 112, 114, 116, 118 could operate on one carrier, which is the serving frequency, and thus would only have to measure one additional carrier. As such, every 40 ms the UE (e.g., UE 110), for example, the UEs 110, 112, 114, 116, 118 can switch to another carrier to perform measurements thereon. This means every 40 ms that the UE 110, for example, could measure once as a measurement gap reception period (MGRP). At each measurement sample, measurements could comprise any network measurement of network conditions related to the frequency band, network device operating (communicating) the frequency band, or channel conditions, such as a signal strength, a channel quality, a signal-to-noise-plus interference ratio (SINR), a received signal strength indictor (RSSI) or other measurement such as a reference signal received power (RSRP), a reference signal received quality (RSRQ), or the like. The UE can then generate channel state information (CSI), one or more channel quality indicators (CQIs) or the like to a transmission path for transmission based on one or more of the measurements.

However, if two or more additional carriers are present on the network or within communication range (communicatively coupled to the UE device 110) for the UE device 110 to measure, then three CCs could exist on the network with the serving frequency carrier that the UE device 110 can downlinks data and communicate on. In a first measurement gap of a sequence of gaps, the UE device 110 can measure a second frequency (e.g., the serving frequency being the first), for example, and in a second or subsequent measurement gap the UE device 110 could measure a third frequency of a different CC. This means that at every 80 ms the UE device could end up only measuring a CC once, which could be a longer delay than just having to measure one frequency carrier, in which the total delay is proportional to the number of carriers that the UE device 110 has to measure. Thus, thirty-two or more carriers would mean a gap delay of approximately 32*40 ms (measurement gap repetition/reception period) to get one sample of a particular frequency or frequencies (inter-frequency or intra-frequency) of one or more different NDs. This longer delay can create problems for UEs, which may not be able to measure the frequencies within a sufficient or efficient time frame. This longer delay can also cause further problems with network handovers and determining what cell or cell ND is optimal in an adequate time based on the conditions of the UE device 110, for example.

In another aspect, the network objective therefore is to enhance the time measurement gap for the carriers belonging to a normal performance group, which can receive more measurements than a reduced performance group. The network can allocated which carriers or NDs are a part of which group. For example, the normal performance group could have the macro cell NDs 202, and 204, while the reduced performance group could have small cell NDs 106, 108; however, any mix of NDs and associated frequency carriers can be designated by the network or ND device (e.g., macro cell ND 102) or the like. The NDs or UEs of the network can be enhanced in various embodiments to enable carrier aggregation of up to 32 component carriers for both DL and UL, and further enable about frequency five carriers or more, for example, to be supported at one time. Thus, in addition or alternatively for CA, two measurement performance groups for CA various specific cell measurement gap patterns for CA to support up to 32 CC in CA are disclosed.

Figure 2:
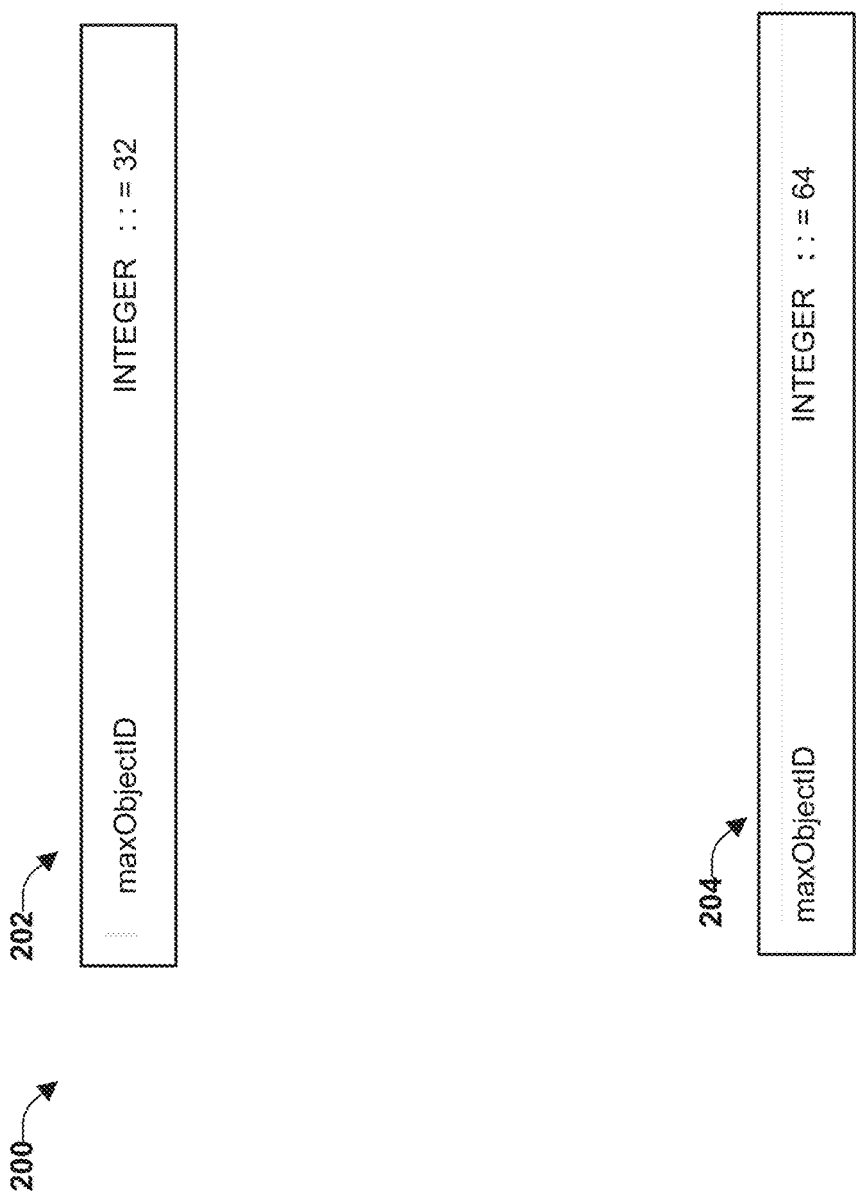
FIG. 2 illustrates examples of a data slot indicating a number of measurement objects according to various aspects or embodiments being disclosed.

Referring to FIG. 2, illustrated are examples of identifiers (IDs) for the number of measurements for a carrier that instruct a UE (e.g., UE device 110) from the eNB (e.g., NDs 102, 104). In radio resource (RRM) measurement in LTE, the frequency carrier or band that the UE 110 performs a measurement can be configured by a measurement object (e.g., measObject). The maximum number of measurement objective IDs maxObjectId 202, for example can be defined in 3GPP specifications. In principle, a single measurement object is configured per radio frequency (RF) carrier. Considering up to thirty-two CCs projected for Rel-13 CA, theoretically the number of measurement object IDs to meet objectives can be increased to an even larger value (e.g. 64). On the other hand, the maximum value expressed by the data field 202 could be still sufficient. There might be some cases when the UE 110 is configured with up to 32 CCs, eNB could derive the necessary information for the purpose of CCs management from a measurement report on one CC in the same frequency band. Such a solution, for example, could be applied at least to the aggregation of carrier B and C when carrier B and C are in the same frequency band, for example. Correspondingly, the required measurement object IDs can be reduced and current value could be sufficient.

The ID 202 includes thirty-two CCs as a way to designate a measurement of object ID. When the network increases the measurement object to accommodate more than 32 CCs (e.g., as in the data ID 204 maxObject ID designating the max integer 64), the network also can configure more measurement objects to link to the measurement configuration (MeasGapConfig), in which 32 may not be enough. Thus, the eNB ND 102 can provide for a suggested increase to about 64 CCs or other amount, which is just an example, in order to accommodate the increase in number of carrier frequencies. The E-UTRAN, for example, can apply processors with the data IDs 202 or 204, for example, or some other increase, to ensure then that whenever the UE 110 receives a measConfig, it includes a measObject for each serving frequency with the maxObjectID, for example.

Figure 3:
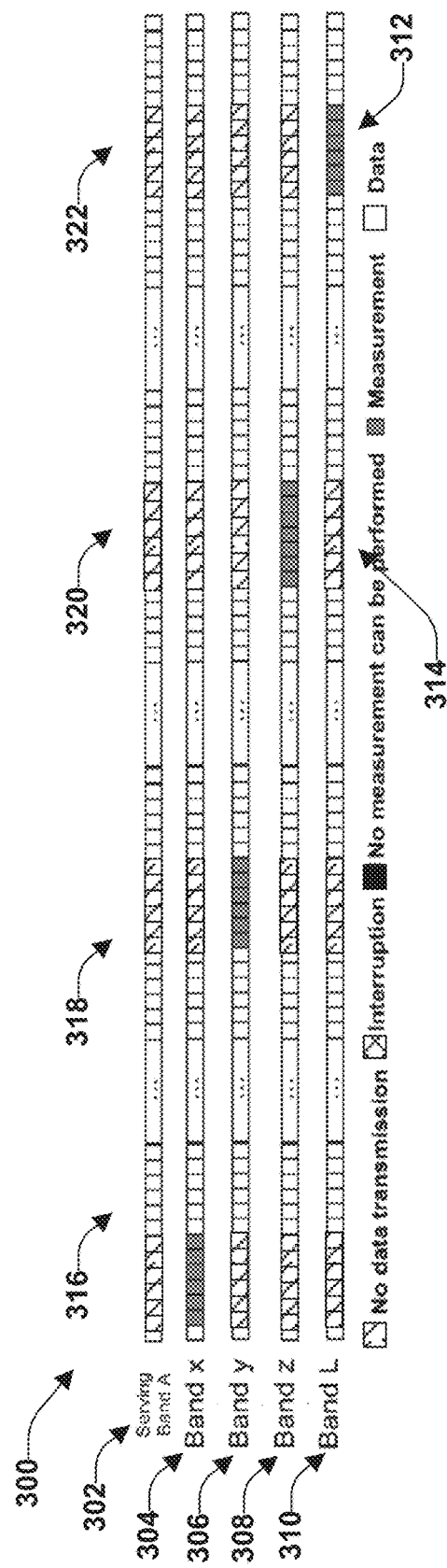
FIG. 3 illustrates an example measurement gap pattern according to various aspects or embodiments being disclosed.

Referring to FIG. 3, illustrated is an example of a measurement gap pattern 300 in accordance with various embodiments and in reference to FIG. 1. The measurement gap pattern 300 can operate, for example, with a measurement gap repetition/reception period of either as a 40 ms or a 80 ms. The measurement gap pattern 300, for example, can be implemented with a single server (serving) band for operation with a single radio frequency (RF) chain (not shown) with a constant gap duration of each gap at about 6 ms, which can be provided by the eNB (e.g., ND 102) to the UE device (e.g., 114). An RF chain (e.g., a transmit circuitry component/receive circuitry component), for example, can comprise one or more processing components (e.g., filters, digital signal processors, amplifiers or other components for processing data signals) that can cover various ranges the RF spectrum. The UE 114 does not have to utilize all RF chains (e.g., RF chains 402, 404 illustrated in FIG. 4, or other communication component) to do inter-frequency measurement for a certain frequency component carriers via the measurement gap pattern 300.

As state above, the duration of each gap can be about 6 ms or other duration, which can be applied or configured by the eNB (e.g., ND 102) to the UE device 114 of FIG. 1, for example. During this 6 ms gap there is no data transmission. However, the UE device 114 can also have CA capability, which means the UE device 114 can operate with more than one RF chain at a time. Thus, with more than one RF chain (e.g., 402 and 404), it is possible that the UE device 114 can increase the throughput gain by using some of the RF for measurement and simultaneously having data. As such, radio resource management (RRM) measurements without a gap can bring up to 15% of throughput gain (e.g., 40 ms MGRP) as such it is a desire to improve UE device performance especially in case of CA with a large number of CCs. To achieve this benefit, measurement gap can be better applied to only relevant serving cells (i.e., to the serving cells operating on the RF circuit measuring the concerned frequency), or particular CCs, for example, as further discussed below.

The measurement gap pattern 300 (i.e., 40 ms MGRP, 80 ms MGRP, or other MGRP) can be configured by the network to the UE 114. The network device (e.g., eNB 102) can take into account that the UE 114 performs measurements one band/component carrier at a time to satisfy the measurement requirement and that all bands/CCs during the measurement gap will not have downlink transmission. For example, the network could have five frequencies available such that the serving band is band A 302, which can be the serving frequency that the UE facilitates connected operations on. The other bands, for example, can include Band X 304, Band Y 306, Band Z 308 and Band L 310, which can each comprise different component carriers. The black gaps indicate where no measurement can be performed (e.g. none illustrated in FIG. 3), the darker shaded gaps (e.g., gaps 312) indicate where measurements of the bands can be performed and the lighter shaded gaps or hashed gaps (e.g., 314) indicate where no data transmission can occur.

Based on the measurement gap pattern 300, the UE device 114 could perform measurement on CC X 304 in the first 40 millisecond gap 316, while there is no data transmission on serving CC A 302. Each CC, for example, can represent a frequency CC or range for DL or UL. Then in the next 40 millisecond measurement gap 318, for example, the UE device 114 can measure CC Y 306. Then in the third measurement gap 320, the UE device 114 can measure CC Z 308 and subsequently measure CC L 310, in the fourth measurement gap 322. Then the UE device 114 can cycle again to measure CC X 304 again, in which the sequence of measurement gaps can continuously repeat.

Figure 4:
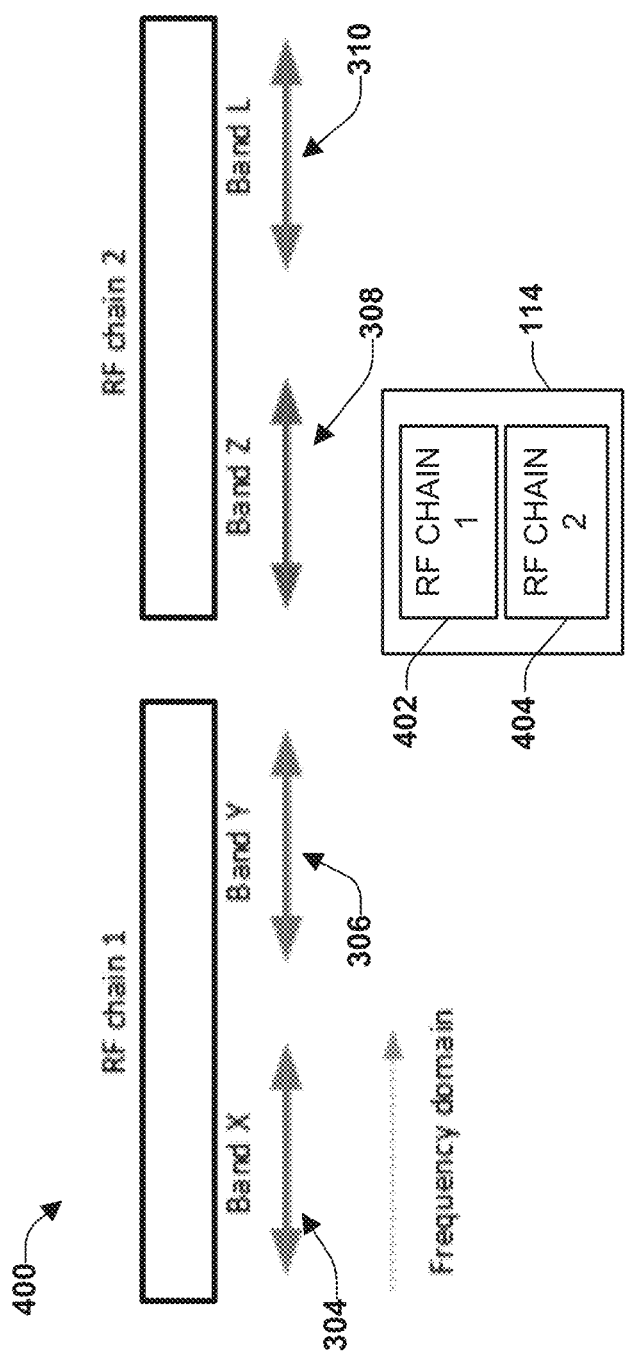
FIG. 4 illustrates an example UE device with different radio frequency processing chains and respective band coverage according to various aspects or embodiments being disclosed.

Referring to FIG. 4, illustrates an example of a CA scenario 400 together with an example UE 114, where for an RF chain1 402, the UE device 114, for example, can cover the differing frequency CCs as band X and Y (e.g., CC X 304 and CC Y 306). Each RF chain1 402 and RF chain2 404 can comprise one or more components for a signal processing chain, for example, that can include a filter as well as hardware to increment the filter as well as further process RF signals for data. Because the frequency can be high, not all of the RF chains can cover all of the frequency CCs at once. For example, RF chain1 402 can only cover CC X 304 (e.g., any frequency range either for DL or UL as specified by 3GPP) and CC Y 306. Additionally, RF chain2 404 can only cover different CCs as band Z 308 and band L 310, in which each RF chain1 402 and RF chain2 404 can cover certain frequency CCs (e.g., component carriers) or bandwidths of a frequency spectrum, in which a component carrier can refer to a frequency band, or a particular bandwidth of the frequency spectrum, for example.

Figure 5:
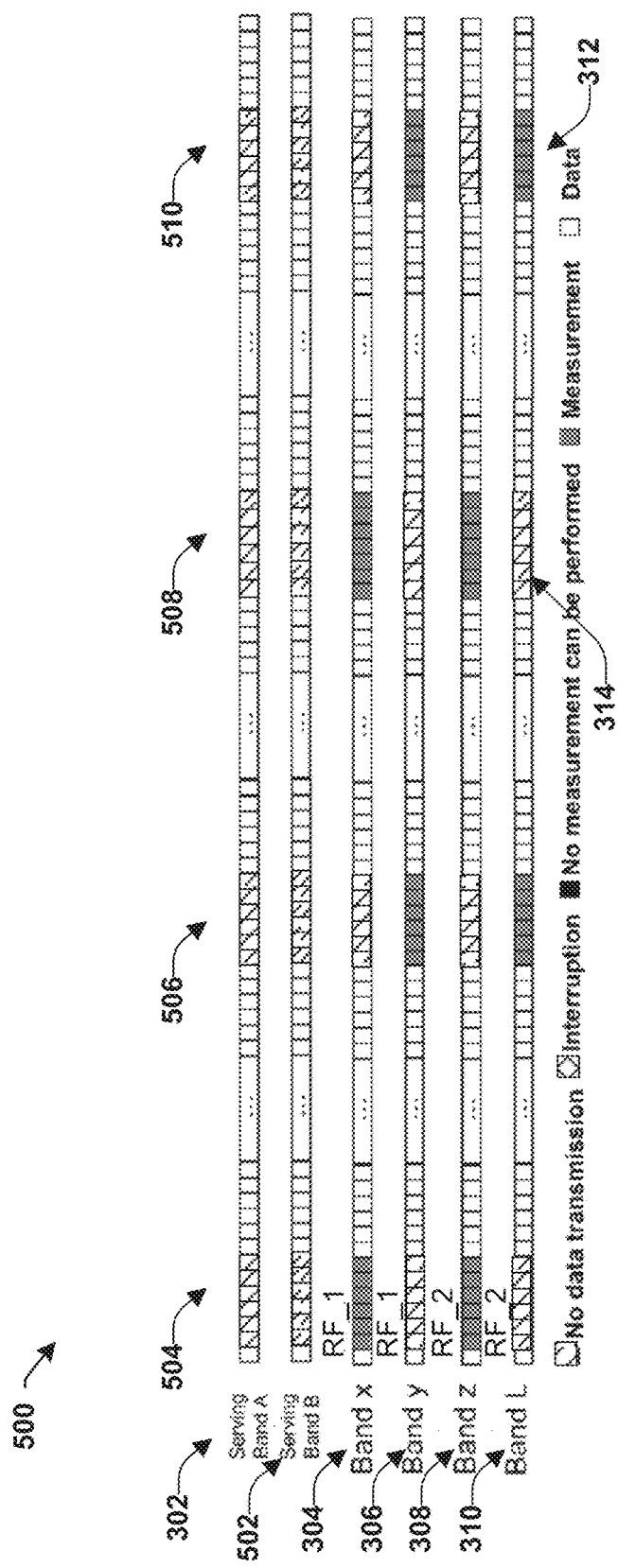
FIG. 5 illustrates another example measurement gap pattern according to various aspects or embodiments being disclosed.

Referring now to FIG. 5, illustrated is an example of another measurement gap pattern 500 of a measurement gap configuration information element for release 14 and other future releases beyond to reduce measurement delay via one or more network devices on the network. As in the measurement gap pattern 300 of FIG. 3, a measurement delay in the measurement gap pattern 500 occurs in a pattern of four measurements to obtain a measurement sample of each Band (e.g., CC X, Y, Z, and L). As such in every 160 ms the UE device 114 can obtain one sample of each CC, which is considered the measurement delay. In the measurement gap pattern 300, if the UE device 114 can measure CC X 304 and Y 306, using one serving frequency, for example, and CC Z and L while using a second serving frequency.

In the first measurement gap 502 the UE device 114 can measure CC X 304 using RF chain1 402 and CC Z 308 using RF chain2 404, and measure simultaneously. Likewise, in the second measurement gap 504, the UE device 114 could measure CC Y with RF chain1 402, and measure CC L 310 with RF chain2 404. The pattern then repeats itself for measurement gaps 508 and 510. Now in each measurement gap the UE device 114 could measure two CCs instead of one CC, and the measurement delay has thus been cut in half because the UE device 114 can utilizing both RF chains simultaneously. Instead of needing four measurement gaps to obtain measurement samples of all the bands or CCs, only two could be used in this scenario for example.

Additionally or alternatively, the network could assume the UE device 114 only has one RF chain instead of two, while the measurement requirements are also based on only one RF chain, which would not take advantage of the network device or UE capabilities unless adequate communication is ensured between network devices (e.g., the UE 114 and eNB 102). Therefore, gap configurations can be further added to the 3GPP standards (TS 36.331) for further facilitating communication based on a CA specific measurement pattern measurement. Instead of only utilizing the existing zero and one, which is 40 ms and 80 ms, an additional specification could be added as illustrated in FIG. 6 as CA-gap0 602, which is part of a measurement gap configuration (MeasGapConfig) on an information element (IE) 600.

Figure 6:
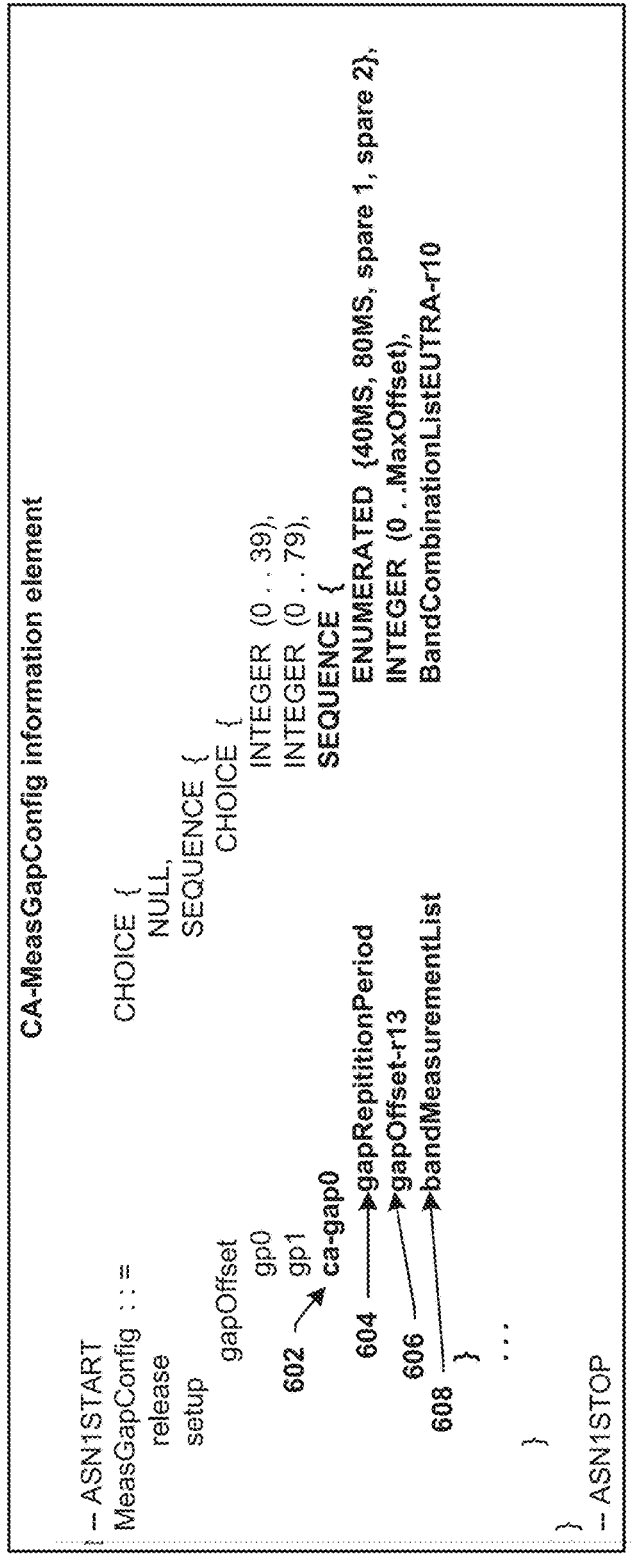
FIG. 6 illustrates an example modification of a measurement gap configuration information element for release 13 or beyond according to various aspects or embodiments being disclosed.
Figure 8:
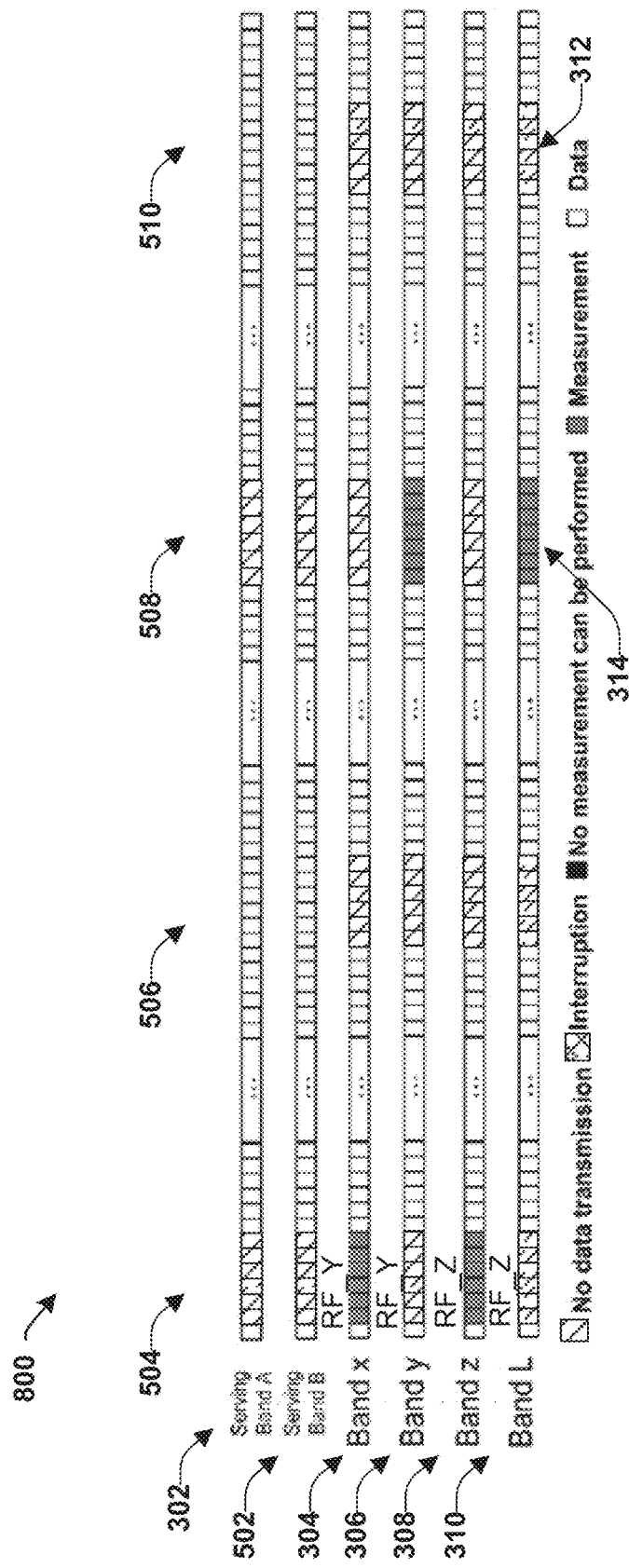
FIG. 8 illustrates another example measurement gap pattern according to various aspects or embodiments being disclosed.

FIG. 6 illustrates an example of a measurement gap configuration or MeasGapConfig that enables the measurement gap patterns to be communicated and implemented between NDs (e.g., eNB(s) and UE(s)) such as illustrated in FIGS. 5 and 8, for example. The data slot or item CA-gap0 602 indicates the gap repetition period 604, which could be 40 ms and 80 ms, as well as have one or more spares for optional or future extension. Additionally, the CA-gap0 602 data item of the MeasGapConfig IE can further comprise a measurement gap offset 606, which indicates when the gap has started for further measurement. The CA-gap0 602 further indicates a band measurement list (band MeasurementList) (or a supporting CC data set) 608, which includes which measurement Band the UE should measure using that measurement gap. For example, a reduced performance group or a normal performance group could divided and be specified as well by indicating certain bands needing measurement, either more frequently or at all with the band measurement list 608.

The gap offset (gapOffset) describes that the gp0 value can correspond to a gap offset of a Gap Pattern Id "0" with measurement gap repetition/reception period (MGRP)=40 ms for example. The gap offset of gp1 can correspond to the gap offset of Gap pattern "1" with a MGRP=80 ms. These gap offset pattern IDs can be used to specify the measurement gap pattern to be applied as defined in the specification of release 13 or beyond, for example, which provide information for a selection to be determined (e.g., via the UE 114 or the eNB 102), for example, among the IDs. For example, ca-gap0 602 comprises the gapReptitionPeriod 604 as defined in TS 36.133, for example, and the gapOffset-r13 606 as the gapOffset value based on the gap pattern repetition period (or MGRP) (gapRepetitionPeriod) selected, or the measurement gap pattern repetition period as defined in 3GPP specification TS 36.133, for example. Finally, the bandMeasurementList 608 specifies or indicates the bands/CCs that could be measured using the same gap period or MGRP.

Figure 7:
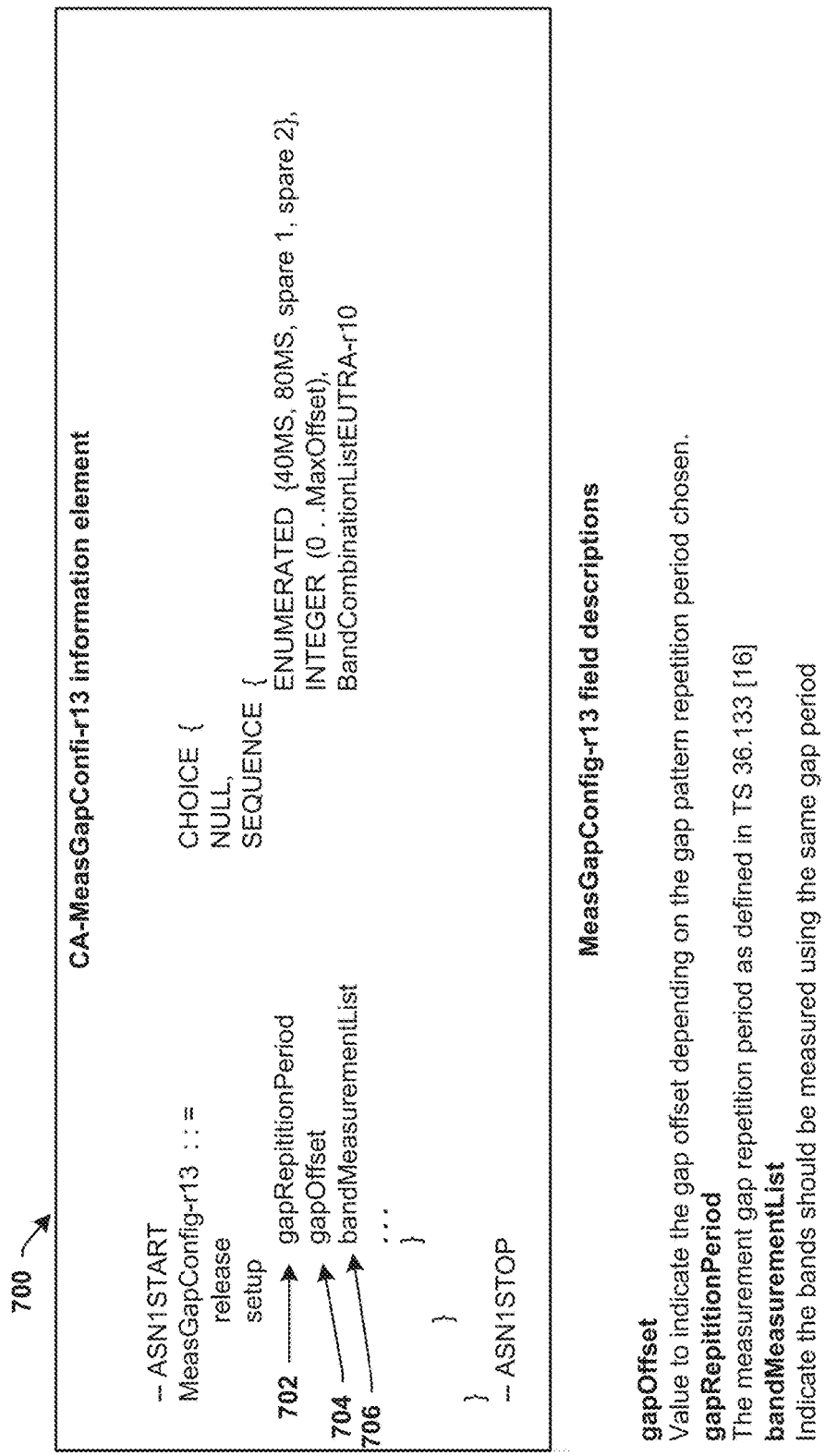
FIG. 7 illustrates an example of a measurement gap configuration information element for release 13 or beyond according to various aspects or embodiments being disclosed.

Alternatively, FIG. 7 illustrates a measurement configuration (MeasGapConfig) IE alternative for 3GPP release 14 and beyond for carrier aggregation (e.g., CA-MeasGapConfig-r13 ID) 700 with measurement gap patterns based on a per CC basis. The first option could be to add another measurement gap in the existing IE, as provided above in FIG. 6 although a new measurement gap configuration CA-MeasGapConfig-r13 IE for the CA 700 could be demonstrated with at least some similar content as IE 600 of FIG. 6. For example, the gap repetition period 702 could be 40 ms and 80 ms, as well as have one or more spares for optional or future extension. Additionally, the MeasGapConfig-r13 IE can further comprise a measurement gap offset 704, which can indicate when the gap has started for further measurement and is based on the gap pattern repetition period selected (e.g., by the eNB 102, or re-configured by the eNB 102 based on a selection by a UE 114). A band measurement list (bandMeasurementList) 706 further includes which measurement band (or CC) the UE 114 should measure using that measurement gap or measurement gap pattern.

FIG. 8 illustrates another measurement gap pattern 800 that can enable the increase downlink data efficiency among network devices (e.g., eNB(s) and UE(s)). The UE serving CCs are CCs A+B 302 and 502 as above. RF chain1 402 (RF_1) supports serving CC A 302 in addition to X 304 and Y 306. RF chain2 404 (RF_2) supports serving CC B 502 in addition to Z 308 and L 310. The UE device 114, for example, can thus perform measurement on CC X 304 and Z 308 simultaneously using both RF chain1 402 and RF chain2 404 in the first measurement gap slot 504. Similarly, the UE device 114 can also perform measurement on CC Y 306 and L 310 simultaneously in the third measurement gap time slot 508. With the same measurement performance, the UE device 114 can now can facilitate or enable downlink data on CCs A+B 302 and 502 in the second measurement gap slot 506 and the fourth measurement gap slot 4 510. Here, downlink gaps in data are not needed for these particular CCs or serving bands A 302 and B 502.

As such, a network device can utilize the measurement gap pattern 800 as a CA specific gap pattern to increase downlink data efficiency over other measurement gap patterns (e.g., as shown above). The network or ND can thus configure a similar data pattern to the UE device 114 as in above figures. However, instead of allowing the UE device 114 to produce more measurements utilizing the RF chains (e.g., 402, 404 or others), the network can send down data to the UE device 114 during some of the gap patterns as a configured compromise between the UE 114 and the eNB 102 based on the UE capabilities (RF chains 402, 404, and their respective CC spectrum coverage). The decision from the eNB 102 or other network device or entity, for example, can be based on the network conditions, requests or status reports (e.g., a supporting CC data set from the UE 114) with UE capabilities for which CC measurement gap patterns are most desired based on particular CCs or CC combinations, a reduced delay or gap, no gap, a longer gap, an increased data efficiency/transmission, or a combination, for example.

Figure 9:
FIG. 9 illustrates another example measurement gap pattern as a minigap pattern according to various aspects or embodiments being disclosed.

FIG. 9 illustrates another example of a measurement gap pattern 900 that can utilize both advantages discussed above, an increase in data efficiency/transmission and a reduction in delay via one or more network devices (e.g., eNB 102, ND 114, or other ND). The previously discussed measurement gap pattern 800 of FIG. 8 increased data transmission to allow data to go through in the downlink between some of the data measurement gaps, such as at every other measurement gap or measurement gap time slot. The measurement gap pattern 900 enables data transmission in a mini-gap or small gap pattern fashion, while keeping downlink data and measurement of bands continuous.

In the measurement gap pattern 900, the UE device 114, for example, can indicate the band/CC that it or each RF/communication chain can support and simultaneously allow different RF chains to have downlink data with the compromise being the interruptions 902 and 904. The network, the network device 102, or other network device, for example, can transmit within the measurement gaps 504, 506, 508, and 510 with mini-gap pattern and interruption time on an alternate RF chain1 or 2 (e.g., RF chains 402 and 404). The UE device 114 can be configured to operate on the serving bands or CCs A and B 302 and 502. When the UE device 114, for example, uses RF chain1 402 to measure Band X 304, serving Band A 302 has no data transmission. However, the UE device 114 can still receive downlink data in Band B using RF chain2 404 with interruptions 902 and 904 during RF tuning.

In each measurement gap 504, 506, 508, and 510, the UE device 114 can measure one Band (e.g., X, Y, Z, or L) at a time, which means that the UE device 114 still has one free RF chain to also receive data. As such, if the UE device 114 is preforming a CA, then what the network can do is send data in the Band that corresponds with or can be covered by the RF chain that the UE device 114 has available or free. Because the measurement is simultaneously happening with the data transmission, there are interruptions of about 1 ms, which are indicated in a cross pattern square of FIG. 9, where t the network will not be able to downlink data. The measurement gap pattern 900 is thus is referred to as a mini-gap pattern because when the UE device 114 is tuning into the RF chain, it creates an interruption to other frequency Bands that disrupts the data if the network eNB or other ND is sending or downlinking data. In 6 ms delay periods, the network can actually only send 4 ms of data. In each message gap, it is the same thing for the rest of the figure. The network sends the data using the free RF of the UE device 114.

Figure 10:
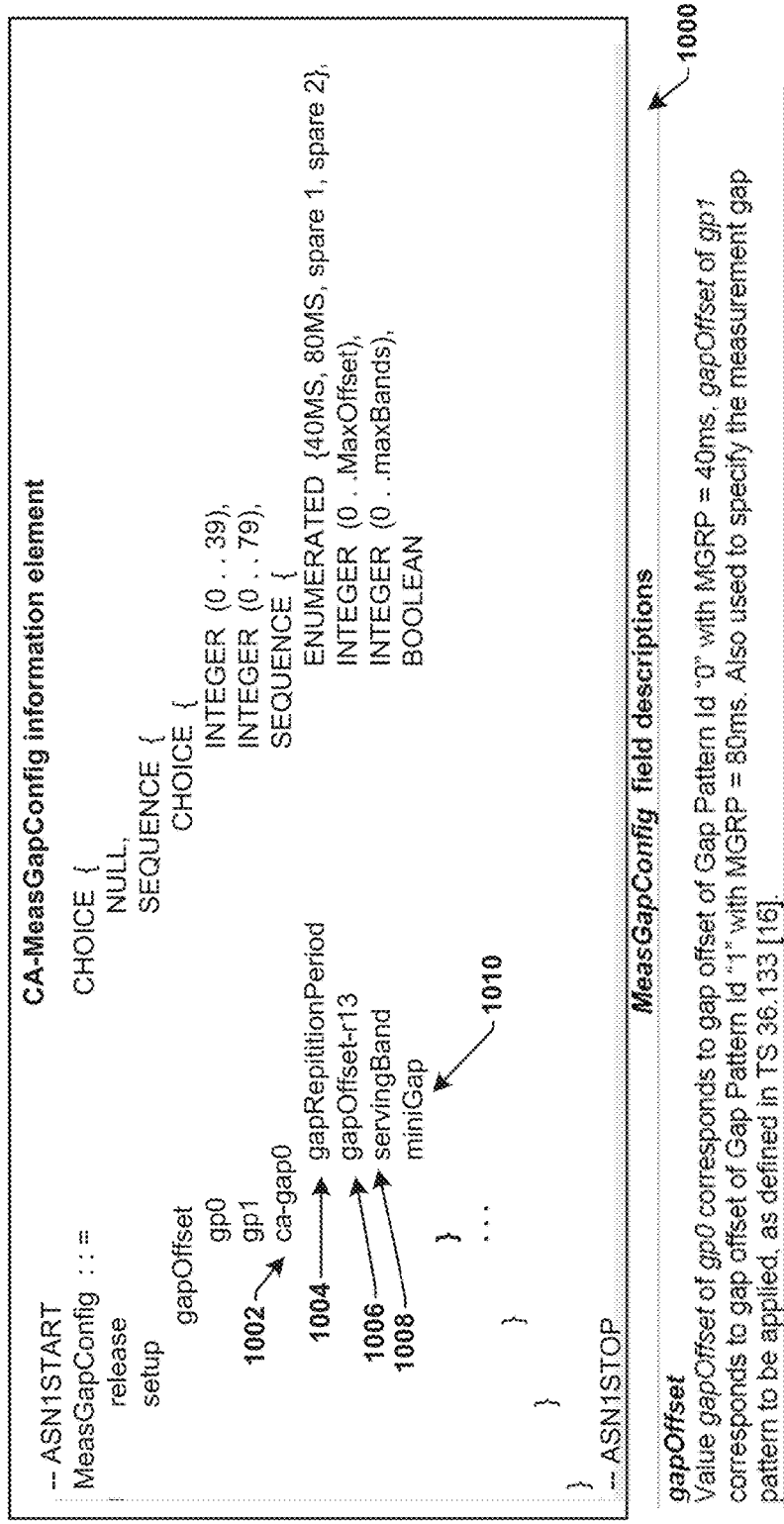
FIG. 10 illustrates an example modification of a measurement gap configuration information element for release 13 or beyond according to various aspects or embodiments being disclosed.
Figure 11:
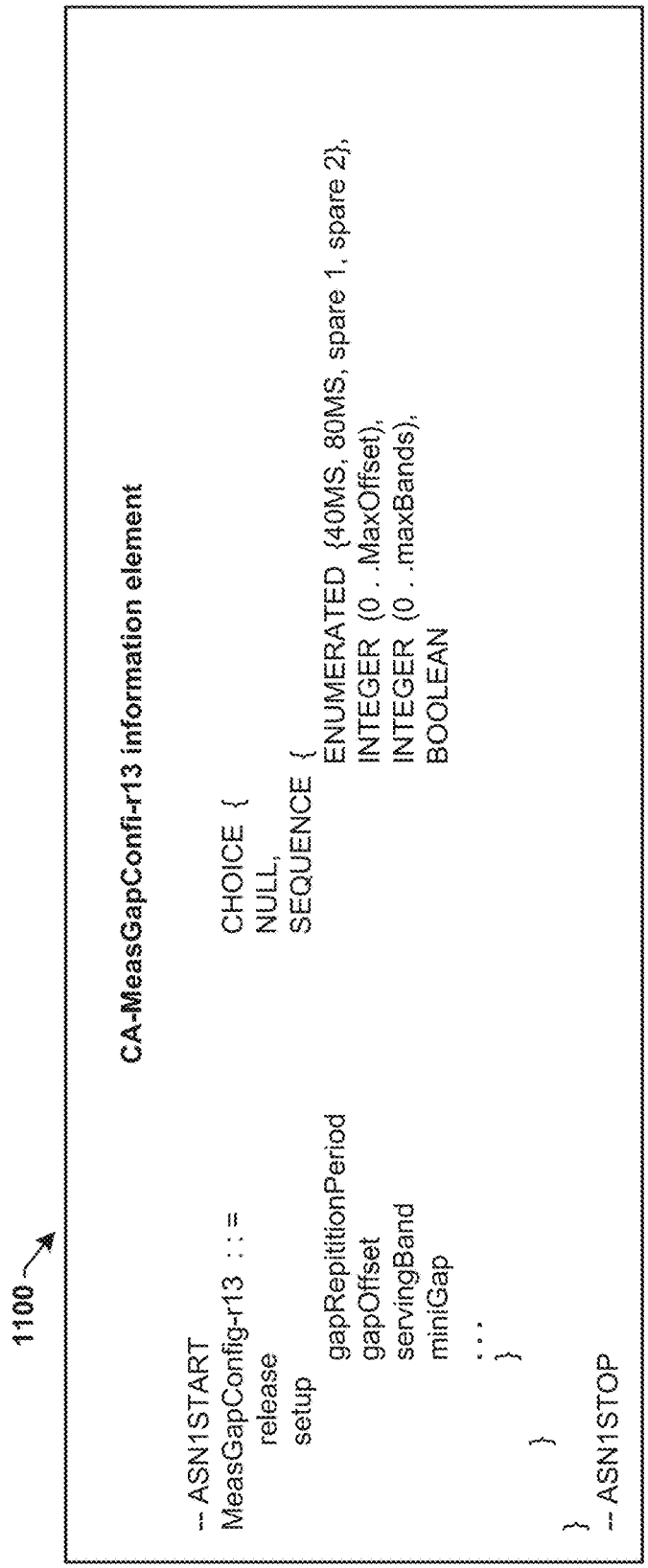
FIG. 11 illustrates an example of a measurement gap configuration information element for release 13 or beyond according to various aspects or embodiments being disclosed.

Referring now to FIGS. 10 and 11, illustrated are additional standard modifications or data sets for the IEs 1000 and 1100 to enable the mini gap configuration or measurement gap pattern IE 900 of FIG. 9, for example. The modification for example can be submitted in TS 36.331 for enabling measurement gap configurations. The data slots or indications of the CA-gap0 1002 include a gapRepitionPeriod 1004, a gapOffset-r13 1006, a servingBand 1008 and a Boolean minigap 1010. If the minigap is set to true or active, then the network will send data to the RF chains of the UE 114, for example, via those RFs that are free, if not then during those datalink transmission then it will not have data transmission and the UE will either perform more measurements to reduce measurement delay.

FIG. 11 provides an alternative example for an entirely different IE for the mini gap measurement patter rather than modifying the existing IE in the 3GPP standards TS 36.331.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 12:
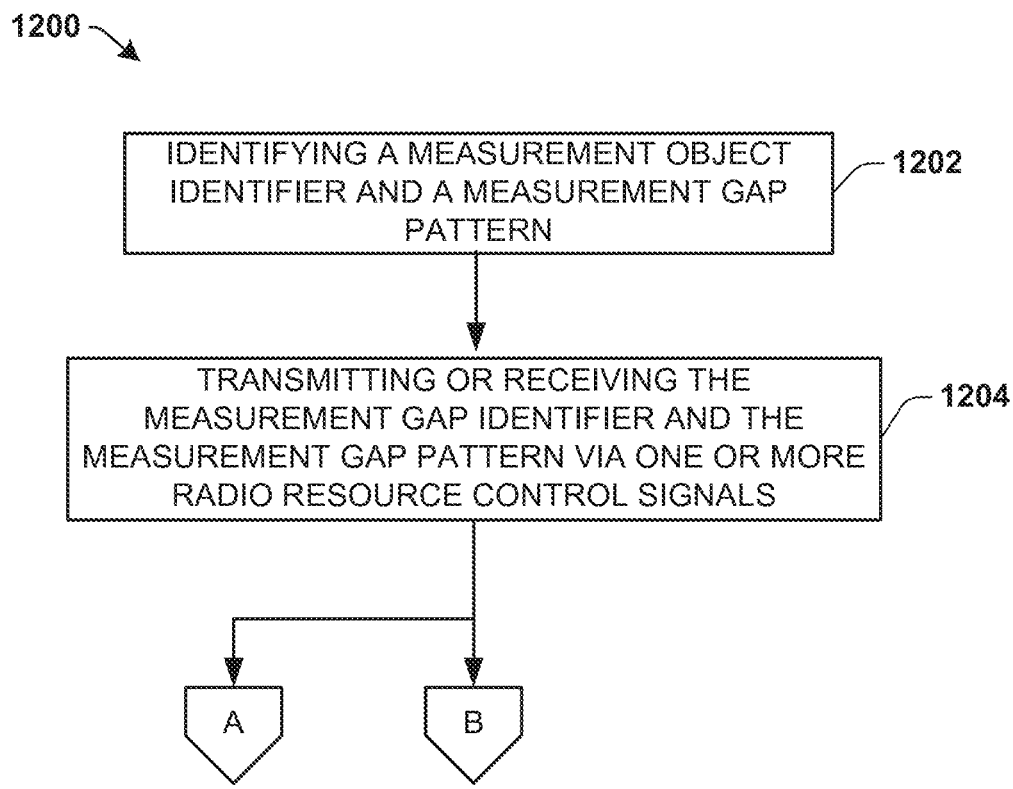
FIG. 12 illustrates a process flow for measurement gap patterns for a network according to various aspects or embodiments being disclosed.

Referring to FIG. 12, illustrated is an example process flow for a method 1200 or a computer-readable media comprising executable instructions that, in response to execution, cause a network device or system comprising one or more processors to perform operations of the method.

At 1202, the process flow includes identifying, via the one or more processors of a network device, a measurement object identifier (ID) (measObject) and a measurement gap pattern. The measurement gap pattern can be determined, for example according to an identification of or an identifying, via one or more processors of a network device, an indication of a UE capability related to a radio frequency (RF)-band capability (e.g., a single RF chain or multiple RF chains and corresponding band coverages of each). The identifying processes can be performed further via a control circuitry component of the network device to identify a MeasGapConfig IE, a gap offset that includes information for a choice/selection of a gap repetition periods among different gap repetition periods to support a carrier aggregation measurement gap pattern, a gap repetition period and a supporting band list that indicates a first set of frequency bands to be measured over a second set of frequency bands.

At 1204, the process flow continues with transmitting or receiving, via the one or more processors of the network device, the measObject and the measurement gap pattern via one or more radio resource control (RRC) signals. The transmitting or receiving, via a transmit circuitry component of the network device, based on the indication, a measurement gap configuration (MeasGapConfig) on an information element (IE) via the one or more radio resource control (RRC) signals.

In other embodiments, the process flow can also include identifying, via a control circuitry component of the network device, with a MeasGapConfig IE, a gap offset, a gap repetition period, a serving band (servingBand) and whether a mini gap or a full gap that is a larger measurement gap than the mini gap based on one or more downlink data.

Based on an indication or report of the UE capability, a desired implementation or request for resources, the process flow can operate according to path A or B as example measurement gap configurations for different measurement gap patterns configured by the network or eNB. Path A can continue in order to reduce interruption, while path B can continue to provide both less interruption time and an increase in data flow. Option path A can facilitate further along path C, as shown below, based on a need by one or more network devices to balance between a reduction in delay and the need for data. All option paths can also be selected according to the UE capability such as having one RF chain or more, as well corresponding band frequencies each is capable of covering in operation.

Figure 13:
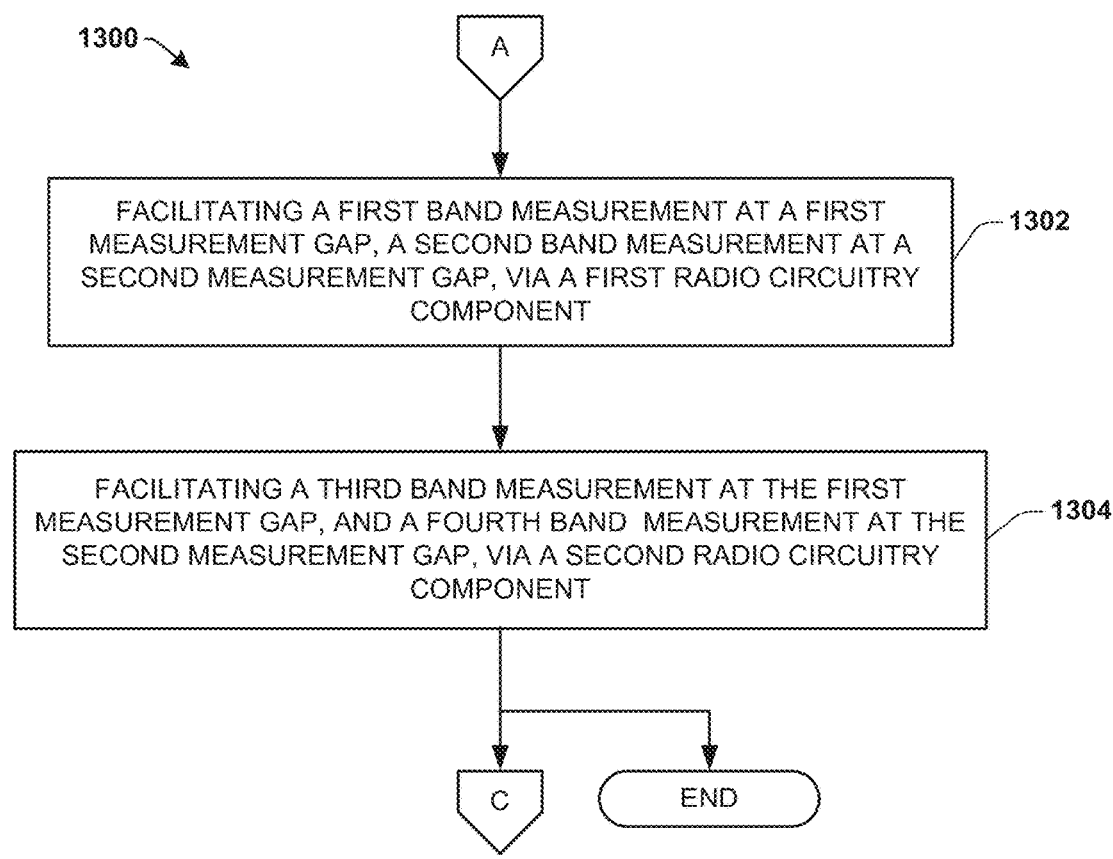
FIG. 13 illustrates another process flow for a measurement gap pattern for a network according to various aspects or embodiments being disclosed.

Referring to FIG. 13, illustrated is an example measurement gap pattern process flow 1300 that continues from process flow 1200 of FIG. 12 according to a selection of measurement gap pattern (e.g., via MeasGapConfig IE 600 or 700 for pattern 500) process flow A.

At 1302, the process flow 1300 continues at the selection of process flow A with facilitating a first band measurement at a first measurement gap and a second band measurement at a second measurement gap, via a first radio circuitry (e.g., RF chain1 420) component.

At 1304, the process flow 1300 continues with facilitating a third band measurement at the first measurement gap, and a fourth band measurement at the second measurement gap, via a second radio circuitry component.

Figure 14:
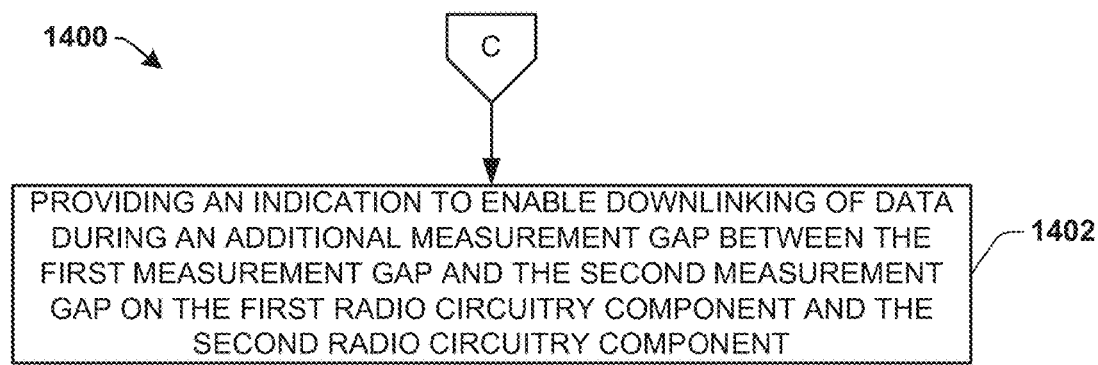
FIG. 14 illustrates another process flow for another measurement gap pattern for a network according to various aspects or embodiments being disclosed.
Figure 15:
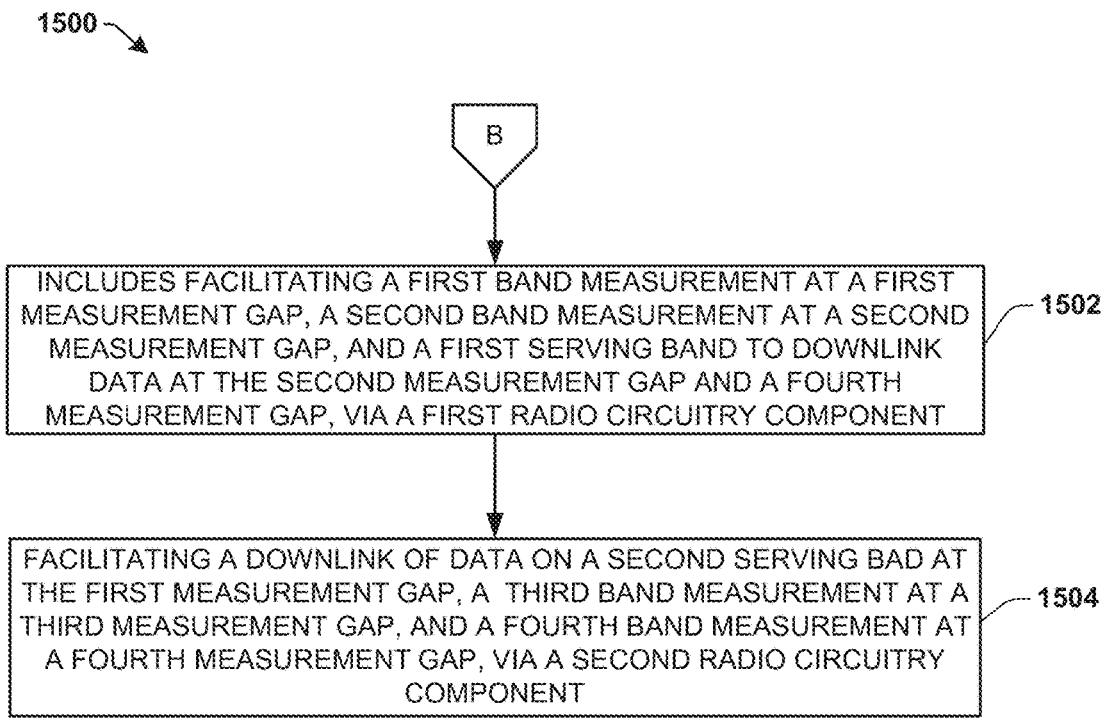
FIG. 15 illustrates another process flow for another measurement gap pattern with a minigap for a network according to various aspects or embodiments being disclosed.

The process flow 1300 can then end or further enable additional process step C at FIG. 14. At 1402, the process flow 1400 can further comprise providing an indication (e.g., MeasGapConfig IE 600 or 700 for pattern 800) to enable downlinking of data during an additional measurement gap between the first measurement gap and the second measurement gap on the first radio circuitry component and the second radio circuitry component. In this case, RF chain1 402 (RF_1, or RF_Y)) supports serving CC A 302 in addition to X 304 and Y 306 of FIG. 8. RF chain2 404 (RF_2, or RF_Z) supports serving CC B 502 in addition to Z 308 and L 310. The UE device 114, for example, can thus perform measurement on CC X 304 and Z 308 simultaneously using both RF chain1 402 and RF chain2 404 in the first measurement gap slot 504. Similarly, the UE device 114 can also perform measurement on CC Y 306 and L 310 simultaneously in the third measurement gap time slot 508. With the same measurement performance, the UE device 114 can now can facilitate or enable downlink data on CCs A+B 302 and 502 in the second measurement gap slot 506 and the fourth measurement gap slot 4 510. Here, downlink gaps in data are not needed for these particular CCs or serving bands A 302 and B 502. FIG. 15 illustrates a method 1500 according to a selection of path A of FIG. 12 for a measurement gap pattern including a mini gap in accordance with various aspects or embodiments herein. The method 1500 can represent, for example, measurement gap pattern having a minigap that can be indicated by MeasGapConfig IE 1000 or 1100 for pattern 900.

At 1502, the method 1500 includes facilitating a first band measurement at a first measurement gap, a second band measurement at a second measurement gap, and a first serving band to downlink data at the second measurement gap and a fourth measurement gap, via a first radio circuitry component (e.g., RF chain1 402).

At 1504, method 1500 continues with facilitating a downlink of data on a second serving band at the first measurement gap, a third band measurement at a third measurement gap, and a fourth band measurement at a fourth measurement gap, via a second radio circuitry component (e.g., RF chain2 404).

In one embodiment, the downlink of the data can comprise a mini gap pattern of interruption time. One or more gaps can be tolerated during the downlink for data in order to keep data flow continuous and band measurement ongoing as the mini gap pattern. Each minigap, for example, can include a pause in downlink data in order for a transition to an RF serving band or chain. In this case, RF chain1 402 (the first radio circuitry component) can operate with a pause of no data link and measurement at the third measurement gap, and RF chain2 404 (the second radio circuitry component) can operate with the same pause in DL data and measurement at the second measurement gap. The sequence between the two RF chains can then recycle.

Figure 16:
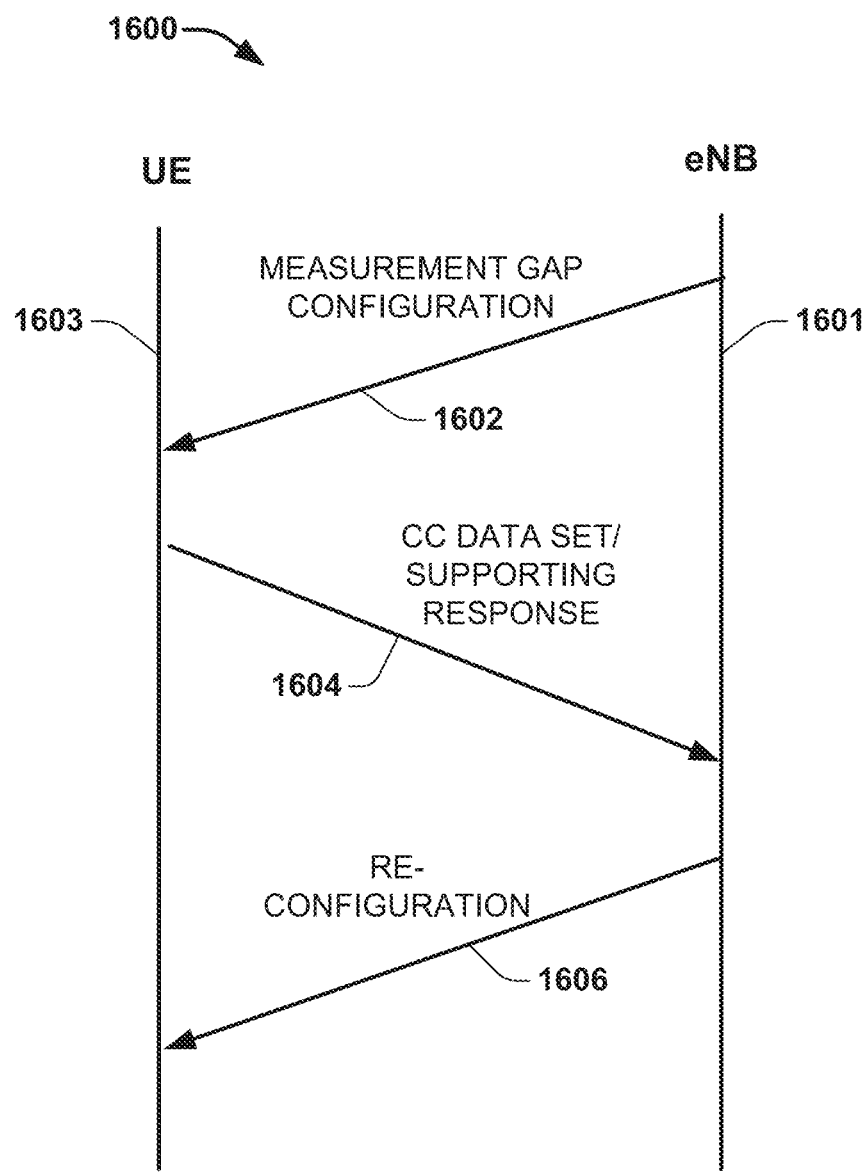
FIG. 16 illustrates another process flow for configuring or re-configuring measurement gap patterns or configurations for a network according to various aspects or embodiments being disclosed.

Referring to FIG. 16, illustrated is a further example of signaling flow for configuring and re-configuring measurement gap configurations by a network device (e.g., eNB, macro cell, small cell, etc.) for a measurement gap pattern (as disclosed above or other measurement gap patterns) to be configured at a UE. The processes of configuration measurement gaps and various measurement gap patterns can be based on different CCs or UE capabilities, including feedback from the UE. For example the flow diagram 1600 demonstrates a measurement gap configuration signaling from the eNB 1601 to a UE 1603 (e.g., eNB 102 to the UE 114 of FIG. 1). The measurement gap configuration signaling 1602 to the UE 1603 can comprise one or more indications or parameters of a measurement gap pattern, as described in detail herein.

In the case, where the eNB 1601 does not know UE capabilities (e.g., the amount or number of RF circuitry (RF communication chains), particular coverage band(s) capabilities, combination of CCs covered by the UE 1603 or CCs within a frequency range or wider bandwidth than one CC, or other communication related parameters/capabilities), the eNB 1601 can provide a one band measurement gap configuration with a measurement gap pattern 300 of FIG. 3, for example, or another measurement gap pattern described in reference to other Figures discussed herein, such as the measurement gap patterns 500, 800, 900, with minigap (network controlled small gap (NCSG)), longer gaps, no gap or other related parameters (e.g., field descriptions discussed herein).

The UE 1603 can further communicate at 1604 in response to the eNB 1601 in response to receiving the measurement gap configuration with measurement gap pattern parameters (e.g., gap offset (gapOffset/gapOffset-r13) or beyond, amount of offset, duration/measure gap repetition period (gapRepetitionPeriod), band list (bandMeasurementList)/CC list, serving band/CC (servingBand), mini gap/smaller gap from a normal or larger gap (e.g., network controlled small gap), or other measurement gap pattern parameters as discussed herein. The communication signaling 1604 can be referred to as a supporting CC data set or as the supporting measurement band list, in which any of the parameters discussed herein can be selected, indicated, or modified by request within the supporting CC data set at the signaling response 1604 or other feedback response to the eNB 1601, before, after or both before and after receiving a measurement gap configuration for the measurement gap pattern at 1602.

In one example, the UE 1603 can provide UE capabilities to the eNB 1601 as part of the supporting CC data set at 1604 in order for the eNB 1601 serving the UE 1603 to determine a configuration/re-configuration of the measurement gap pattern for measuring component carriers as neighboring bands, DL data bands, serving bands or for other use in order to generate one or more measurement reports, for example. The parameters and configuration data can then be communicated at 1602 or re-communicated with different data at 160 to modify the measurement gap pattern.

In some instances, the UE 1603 could determine a tradeoff between efficiency and continuous data being received, which could vary depending upon the UE capabilities as well as the use of the UE's resources at a given time. As such, greater data downlink could be desired based on a threshold resource value for a given application or resource being processed at the UE 1603, in which case one type of measurement gap pattern could be preferred over another, different CCs could be utilized, different parameters based on capabilities of the UE, or other changes or preferences to the original measurement gap pattern or related parameters as discussed herein. For example, a minigap measurement gap pattern could be requested to the eNB in order to ensure a greater downlink and based on the CCs able to be covered according to the UE RF chains and their respective coverage capability over different CCs. Alternatively or additionally, no measurement gap could be indicated or requested by the UE 1603 depending on a desire for a continuous downlink of data at a particular CC or for one or more RF chains covering a particular combination of CCs. Any other combinations of measurement gap patterns can be implemented, facilitated, or re-configured according to the UE capabilities and architecture as discussed herein also.

In other embodiment, some UEs (e.g., 1603) could have one or more RF chains such as with dual RF chains (e.g., 402, 404) that support simultaneous downlink reception, one RF chain 402, or different CC coverage between individual chains among different UEs (e.g., 112 and 1603), which can be indicated by the UE capabilities in the CC data set at 1604. Thus, the UE capabilities can also be reported to the eNB 1603 or other ND at a communication signaling 1604 with the CC data set in order to receive re-configuration of the measurement gap pattern and corresponding parameters or indications related to the measurement gap patterns per RF chain. As a result, the UE 1603 may not demand a measurement gap or use a less frequent measurement gap pattern for specific measurement gap pattern for a specific RF chain (e.g., 402 or 404) of the UE 1603.

In another embodiment, the eNB 1606 can operate to dynamically re-configure measurement group patterns or measurement gaps to some CCs over other CCs, and measurement gaps differently based on the particular CCs being served, the capabilities of the UE 1603, or any other feedback from the UE, for example. As such, re-configuring or generating the measurement gap patterns and associated parameters via measurement gap configuration data are illustrated and described herein in order to minimize interruption to services or serving cells.

Additionally, the number of sub-frames the UE 1603 monitors by DL signals or communicates via UL signals can also be reduced. For example, the mini gap (NCSGs) or the measurement gap duration, as well as the other parameters for implementing the measurement gap patterns at a UE 1603, for example, can be dynamically configured or re-configured via back and forth communications between the eNB 1601 and the UE 1603.

In another aspect, the network or network component (e.g., via eNB 102) can configure an existing measurement gap to the UE. If the UE 1603 has more than one RF chain with coverage of one or more different bands or CCs that can support simultaneous downlink reception, the UE can provide as such at 1604 in a communication such as supporting response or a supporting CC/Band data set (e.g., a list, table or other set of data). The UE 1603 can communicate to the eNB 102 a particular measurement gap pattern or corresponding parameter or capability for each RF chain/communication chain as part of its architecture. As a result, the UE 1603, for example, would not necessarily require one measurement gap pattern or configuration over another, use a less or more frequent measurement gap pattern for a specific RF chain 402 over 404, or use a different one for another chain or set of RF chains. The UE 1603 can then still be able to satisfy the measurement requirements for specific CCs for further network operations, for example, and on a per CC basis.

Referring to FIGS. 17-20, illustrated are different embodiments for a supporting response or a supporting CC data set. In some instances it could be beneficial and feasible to introduce measurement gap enhancements with a single Rx chain. This includes, but not limited to, an increase in UE scheduling opportunity or a reduction in UE power consumption. For synchronous only operation, the measurement gap configurations corresponding to one or more measurement gap patterns with reduced measurement gap length (MGL) can be feasible and beneficial. Further, various advantages are provided by enabling measurement gap patterns configuration/re-configuration on a per component carriers basis with respect to various measurement gaps or particular measurement gap patterns.

In the per CC based measurement gap configuration (MGRP), the MGRP can be configured independently per CC. This includes the case where the measurement gaps are configured for some CCs, but not configured for other CCs. For example, mini gaps or NCSGs can be introduced or selected in the MGRP when per CC measurement gap configurations are configured to reduce the Ack/Nack missing rate due to PCell/SCell/PSCell interruption.

For example, FIG. 17 illustrates a CC data set 1700 that can be communicated to the eNB 114 as part of the communication 1604 of FIG. 16. The CC data set demonstrates various bands or CCs that number up to 32, or can be increased, as discussed herein. Each CC can be indicated along with UE capabilities (e.g., whether a given band is supported and to what extend by a particular RF (communication) chain of the UE, or other capabilities, parameters, selections of description fields related to measurement gap patterns, or other UE feedback). Each CC can be corresponding to an indication of whether a measurement gap is even needed or requested. In some instances a continuous downloading or downlink of data can be desired or possible, without having to enable a gap duration or gap period. In other instances, a particular CC could not be supported, or covered sufficiently by one or more RF chains operating together.

In response to receiving the CC data set, the eNB (e.g., 1601) can respond by signaling a re-configuration of the measurement gap patterns configurations or parameters associated with a particular measurement gap program, such as whether particular CCs are configured or not with a measurement gap. For example, a gap can be generated or provided for a particular CC, such as $CC_1$, $CC_3$, or another $CC_i$ where i is a positive integer, but other CCs such as $CC_2$, $CC_{32}$ or another CC of a particular index could indicate that no measurement gap is requested, desired or selected for. In response, the eNB 1601 could enable a continuous download of data on the CCs not requiring measurement gaps because it is understood that the UE 1603 can measures these channels or CCs adequately with the UE capabilities or communication chains and there is no need for the measurement gap, or for a particular duration until another re-configuration 1604 is communicated these CCs will not be utilizing measurement gaps.

Referring now to FIG. 18, illustrated is another example of a CC data set 1800 in accordance with various aspects or embodiments being described. In particular, when the UE 1603 is configured with carrier aggregation capabilities as part of the UE capabilities or comprises one or more RF chains capable of simultaneous downlink reception, different measurement gap configurations or no measurement gap can be implemented at each RF communication chain. This can include, for example, different kinds of gaps, gap periods, gap offsets or gap durations per CC corresponding to each RF chain.

The CC data set 1800 can include UE capabilities as well as specific CC bands corresponding to indications for a particular type of gap or measurement gap duration. For example, a long gap, a short gap, or no gap can be indicated as corresponding with the different CCs. The longer gap can be a gap that is longer in duration than the mini gap or longer in duration than a standard 3GPP or other designated gap duration or length, for example. The CC data set 1800, for example, demonstrates that $CC_1$ or another $CC_i$, can have a long gap. Other CCs such as $CC_2$, and $CC_{32}$ could indicate that no measurement gap is requested, and in the case of $CC_3$, a short (mini) gap can be requested, for example, for measurements on this particular CC. In response, the eNB 1601 could enable different measurement gap configurations in a re-configuration 1606 for different measurement gap patterns per CC and corresponding RF chain as part of the UE capabilities.

Referring to FIG. 19, illustrated is another example of a CC data set 1900 in accordance with various aspects or embodiments being described. When the UE 1603 is configured with carrier aggregation capabilities as part of the UE capabilities or comprises one or more RF chains capable of simultaneous downlink reception, different measurement gap configurations or no measurement gap can be implemented at each RF communication chain (e.g., 402 or 404) according to particular one or more CCs at each RF communication chain. This can include, for example, different kinds of gaps, gap periods, gap offsets or gap durations per CC corresponding to each RF chain as well different measurement gap patterns associates with each RF chain or corresponding operating band. The CC data set 1900 can include UE capabilities as well as specific CC bands corresponding to indications for a particular type of measurement gap pattern, such as measurement gap patterns associated with measurement gap patterns 300, 500, 800, 900 or other similar patterns as discussed herein along with respective measurement gap configurations, corresponding information elements or associated parameters.

In addition, various combinations of CCs can also be indicated for certain measurement gap patterns over others. Various CCs such as $CC_1$ and $CC_i$ can be designated with a same measurement gap pattern and be utilized in conjunction with certain UE capabilities, such as the particular RF chains (e.g., 402 or other equipment) that cover bands or CCs within the same frequency range, for example. Other CCs can be designated with other measurement gap patterns, such as with $CC_2$ having a particular measurement gap pattern Y, and $CC_3$ having another different measurement gap pattern Z, which could also correspond or not to various UE capabilities of RF chains 402, 404 or other chains or processing components of the UE 1603 or other UEs, for example. Further, $CC_{32}$ could indicate no measurement gap or pattern.

Figure 20:

Referring to FIG. 20, illustrated is another example of a CC data set 2000 in accordance with various aspects or embodiments being described. In this example, similar to other CC data sets described, the CC can be indicated by the UE 1603 to the eNB 1601 in order to configure or re-configure the measurement gap pattern configuration parameters or the measurement gap patterns overall to each UE corresponding to particular RF chains. In addition, certain groups of CC can further be indicated in the CC data set 2000 in order to associate with the group particular CCs as well as particular measurement gap patterns/configurations or none at all. For example, CC group 1 can include CCs comprising $CC_1$, $CC_2$ and $CC_3$ be selected or indicated to the eNB 1601 as being optimal or suited for a particular measurement gap configuration for a particular measurement gap pattern, while CCs of other groups (e.g., CC group M) can be associated with other CCs such as $CC_i$ or others. Other CCs such as $CC_{32}$ could be made to correspond with no gap being provided for. Therefore, when the UE 1603 or other UE is configured with carrier aggregation capabilities, the UE 1603 can send or create a CC data set or indications corresponding to a CC group for the network in terms of the requested gap configuration or re-configuration. Each CC group can be indicated as per band based, where other criteria or rules for defining particular CC groups are not precluded.

Figure 21:
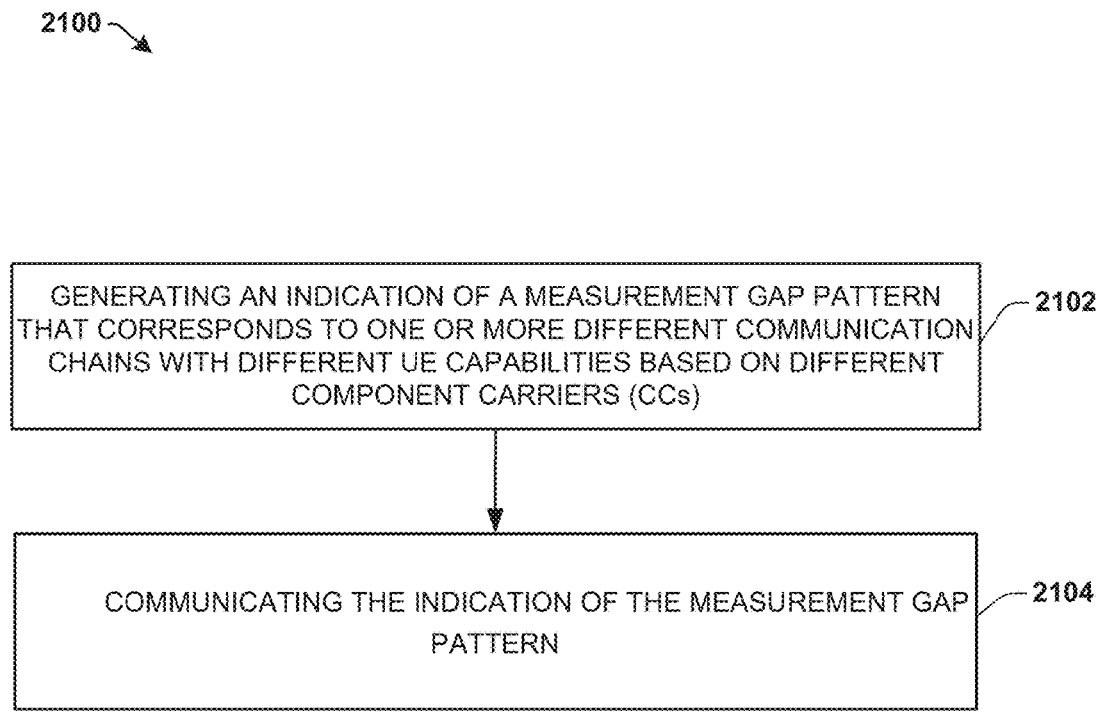
FIG. 21 illustrates another process flow for measurement gap pattern configurations with a CC data set based on different CCs of a network according to various aspects or embodiments being disclosed.

Referring to FIG. 21, illustrated is a method for signalling measurement gap configurations for measurement gap patterns per CC or on a CC basis in accordance with various aspects or embodiments described herein. The method 2100, for example, or any method herein can be implemented as executable instructions that, in response to execution, cause a processor of a network device (e.g., an eNB or a UE) to perform operations. The operations can initiate at 2102 with generating, via the one or more processors of the network device, an indication of a measurement gap pattern that corresponds to one or more different communication chains with different UE capabilities based on different component carriers (CCs).

At 2104, the operations can further comprise communicating the indication of the measurement gap pattern, such as for configuration or a re-configuration.

The method can further include identifying at least one of a gap offset that includes information for a choice of different gap repetition periods corresponding to the different CCs and a supporting CC data set comprising a first set of CCs to be measured by a first communication chain of the one or more different communication chains, and a second set of CCs to be measured by a second communication chain of the one or more different communication chains. The indications can include, for example, any of the CC data sets or supporting measurement band lists having indications of whether a mini gap or a full gap that is larger than the mini gap is to be utilized for a downlink transmission by the first communication chain and the second communication chain of a UE.

The method can include processing or generating a response for a reconfiguration of the measurement gap pattern based on a supporting CC data set, wherein the supporting CC data set can comprise first correlations of the different CCs with the one or more different communication chains based on the UE capabilities, and second correlations of different measurement gap patterns with the different CCs.

In response to the CC data set or UE feedback, configuration data or other signaling can be provided to implement a change or modification of the measurement gap pattern based on the UE capabilities and a supporting CC data set within a communication from the UE in response to a transmission of the measurement gap pattern via one or more radio resource control (RRC) signals.

Figure 22:
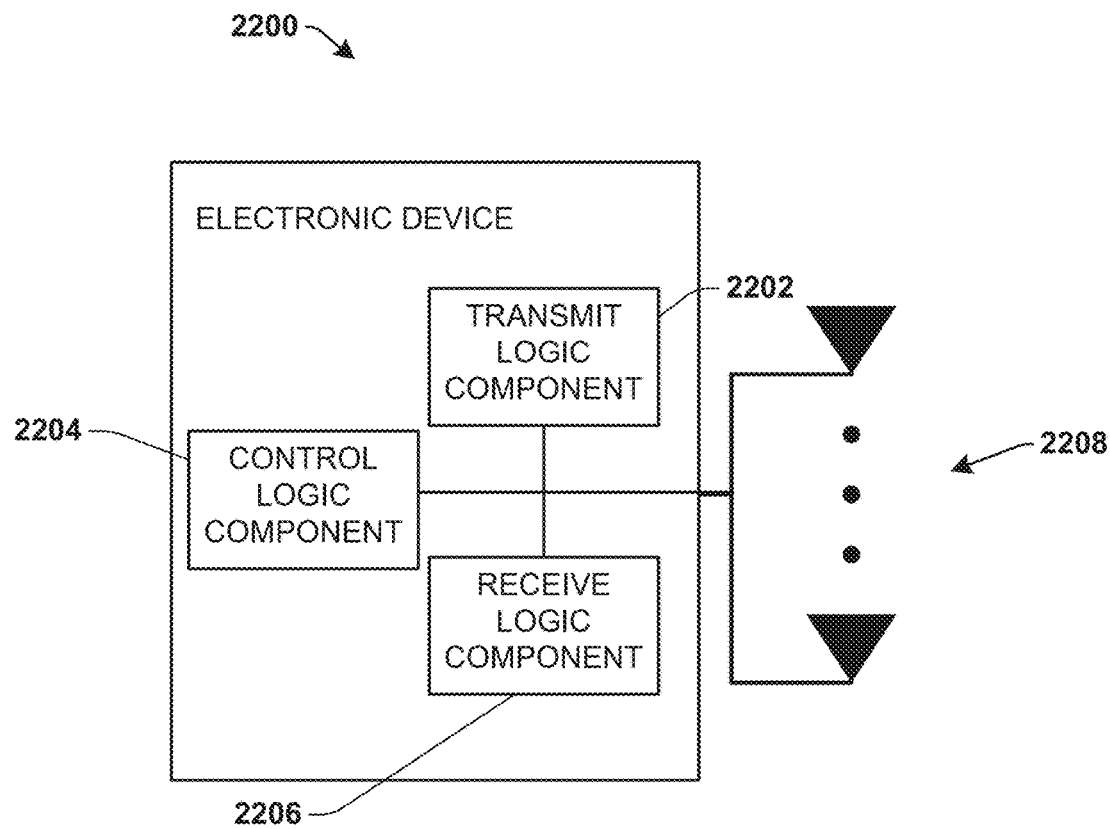
FIG. 22 illustrates an example electronic (network) device according to various aspects.

FIG. 22 illustrates an electronic device 2200 in accordance with various aspects disclosed herein. The electronic (network) device 2200 can be incorporated into or otherwise part of, an eNB (e.g., 102), a UE (e.g., 114), or some other type of electronic or network device in accordance with various embodiments. Specifically, the electronic device 2200 can be logic or circuitry that can be at least partially implemented in one or more of hardware, software, or firmware. In embodiments, the electronic device 2200 logic can include radio transmit logic component 2202 and receive logic component 2206 coupled to control logic component 2204. In embodiments, the transmit or receive logic components can be elements or modules of a transceiver, a transmitter, or receiver chain, as shown. The electronic device 2202 can be coupled with or include one or more plurality of antenna elements 2208 of one or more antennas. The electronic device and/or the components of the electronic device can be configured to perform operations similar to those described elsewhere in this disclosure.

In embodiments where the electronic device circuitry is a network entity or is incorporated into or otherwise part of a network entity, the control circuitry component 2204 can be configured to identify a measurement object identifier (ID) (measObject) and a measurement gap pattern. The transmit circuitry component 2202 can be configured to transmit an indication of the measObject and the measurement gap pattern to a user equipment (UE) via one or more radio resource control (RRC) signals. In addition, the receive circuitry component 2206 (e.g., RF chain1 402 and RF chain2 404) can be configured to receive, via one or more radio resource control (RRC) signals, a measurement gap configuration (MeasGapConfig) on a MeasGapConfig information element (IE) that controls measurements during a plurality of measurement gaps using a carrier aggregation.

As used herein, the term "logic" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. Specifically, the logic can be at least partially implemented in, or an element of, hardware, software, and/or firmware. In some embodiments, the electronic device logic may be implemented in, or functions associated with the logic may be implemented by, one or more software or firmware modules.

Figure 23:
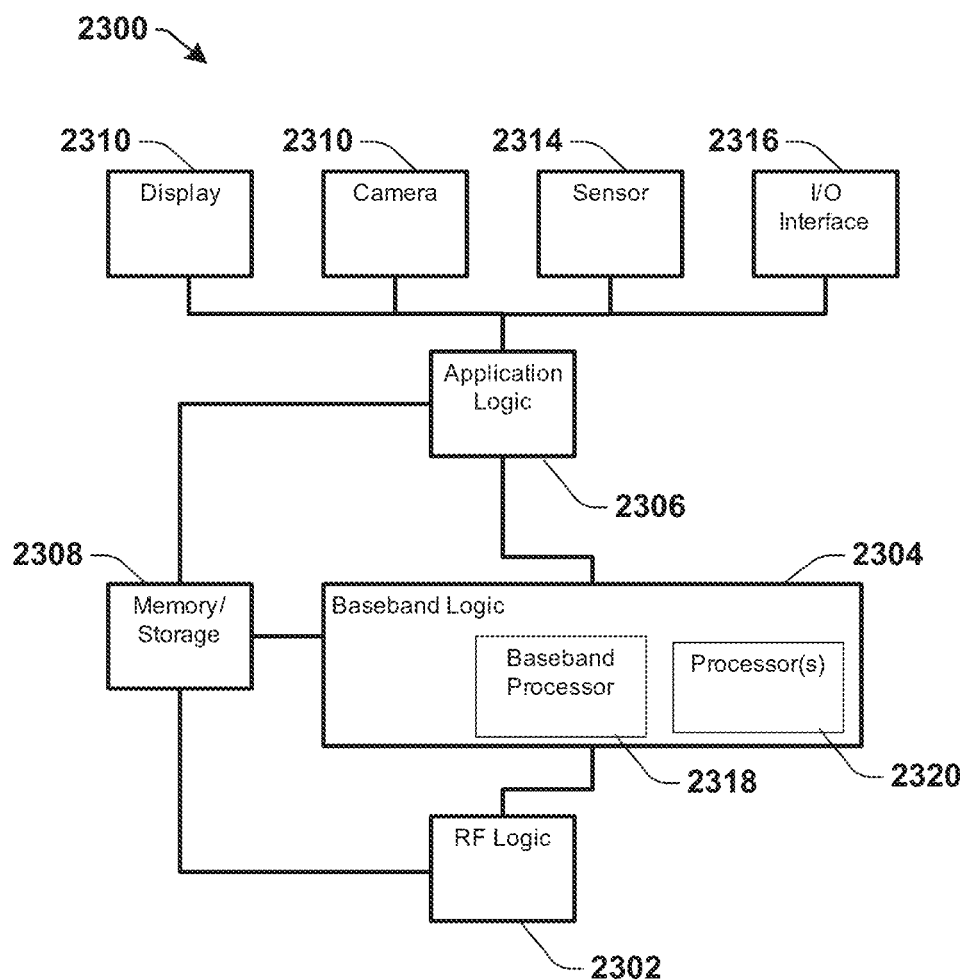
FIG. 23 illustrates example system for operating network measurement gap patterns according to various aspects.

Embodiments described herein can be implemented into a system using any suitably configured hardware and/or software. FIG. 23 illustrates, for one embodiment, an example system comprising radio frequency (RF) logic 2302, baseband logic 2304, application logic 2306, memory/storage 2308, display 2310, camera 2312, sensor 2314, and input/output (I/O) interface 2316, coupled with each other at least as shown.

The application logic 2306 can include one or more single-core or multi-core processors. The processor(s) can include any combination of general-purpose processors and dedicated processors (e.g., graphics processors, application processors, etc.). The processors can be coupled with memory/storage and configured to execute instructions stored in the memory/storage to enable various applications and/or operating systems running on the system.

The baseband logic 2304 can include one or more single-core or multi-core processors. The processor(s) can include a baseband processor 2318 and/or additional or alternative processors 2320 that can be designed to implement functions or actions of the control logic, transmit logic, and/or receive logic described elsewhere herein. The baseband logic 2304 can handle various radio control functions that enable communication with one or more radio networks via the RF logic. The radio control functions can include, but are not limited to, signal modulation, encoding, decoding, radio frequency shifting, etc. In some embodiments, the baseband logic can provide for communication compatible with one or more radio technologies. For example, in some embodiments, the baseband logic 2304 can support communication with an evolved universal terrestrial radio access network (EUTRAN) and/or other wireless metropolitan area networks (WMAN), a wireless local area network (WLAN), a wireless personal area network (WPAN). Embodiments in which the baseband logic 2304 is configured to support radio communications of more than one wireless protocol can be referred to as multi-mode baseband logic.

In various embodiments, baseband logic 2304 can include logic to operate with signals that are not strictly considered as being in a baseband frequency. For example, in some embodiments, baseband logic 2304 can include logic to operate with signals having an intermediate frequency, which is between a baseband frequency and a radio frequency.

RF logic 2302 can enable communication with wireless networks using modulated electromagnetic radiation through a non-solid medium. In various embodiments, the RF logic 2302 can include switches, filters, amplifiers, etc. to facilitate the communication with the wireless network.

In various embodiments, RF logic 2302 can include logic to operate with signals that are not strictly considered as being in a radio frequency. For example, in some embodiments, RF logic can include logic to operate with signals having an intermediate frequency, which is between a baseband frequency and a radio frequency.

In various embodiments, transmit logic, control logic, and/or receive logic discussed or described herein can be embodied in whole or in part in one or more of the RF logic 2302, the baseband logic 2304, and/or the application logic 2306. As used herein, the term "logic" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. Specifically, the logic can be at least partially implemented in, or an element of, hardware, software, and/or firmware. In some embodiments, the electronic device logic can be implemented in, or functions associated with the logic can be implemented by, one or more software or firmware modules.

In some embodiments, some or all of the constituent components of the baseband logic, the application logic, and/or the memory/storage can be implemented together on a system on a chip (SOC).

Memory/storage 2308 can be used to load and store data and/or instructions, for example, for system. Memory/storage 2308 for one embodiment can include any combination of suitable volatile memory (e.g., dynamic random access memory (DRAM)) and/or non-volatile memory (e.g., Flash memory). In addition, the memory 2308 can comprise one or more machine-readable medium/media including instructions that, when performed by a machine (e.g., computer) or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium.

In various embodiments, the I/O interface 2316 can include one or more user interfaces designed to enable user interaction with the system and/or peripheral component interfaces designed to enable peripheral component interaction with the system. User interfaces can include, but are not limited to a physical keyboard or keypad, a touchpad, a speaker, a microphone, etc. Peripheral component interfaces can include, but are not limited to, a non-volatile memory port, a universal serial bus (USB) port, an audio jack, and a power supply interface.

In various embodiments sensor 2314 can include one or more sensing devices to determine environmental conditions and/or location information related to the system. In some embodiments, the sensors can include, but are not limited to, a gyro sensor, an accelerometer, a proximity sensor, an ambient light sensor, and a positioning unit. The positioning unit can also be part of, or interact with, the baseband logic and/or RF logic to communicate with components of a positioning network, e.g., a global positioning system (GPS) satellite.

In various embodiments, the display 2310 can include a display (e.g., a liquid crystal display, a touch screen display, etc.).

In various embodiments, the system can be a mobile computing device such as, but not limited to, a laptop computing device, a tablet computing device, a netbook, an ultrabook, a smartphone, etc. In various embodiments, system can have more or less components, and/or different architectures.

Figure 24:
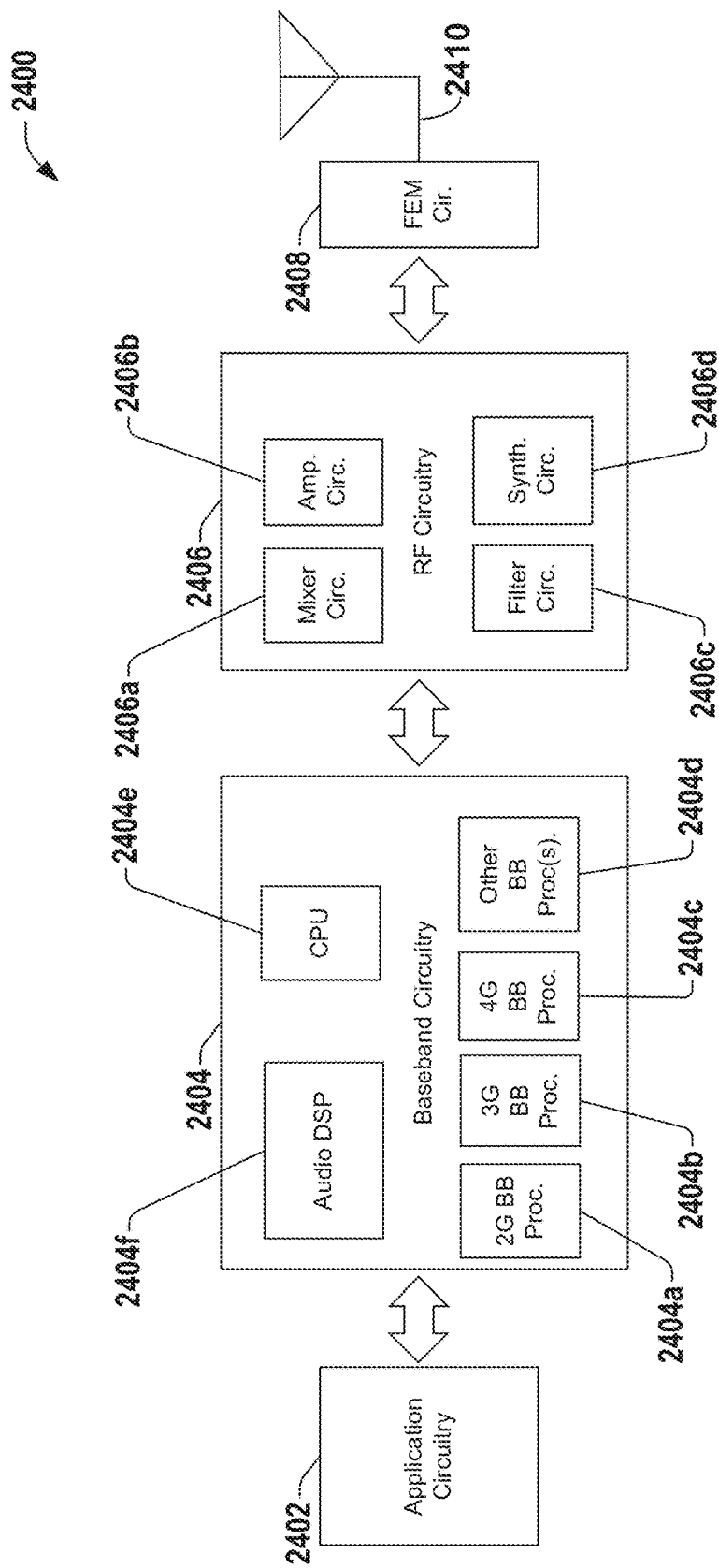
FIG. 24 illustrates an example UE for operating network measurement gap patterns according to various aspects.

Embodiments described herein can be implemented into a system using any suitably configured hardware and/or software. FIG. 24 illustrates, for one embodiment, example components of a cell network device 2400, such as a base station, a macro cell network device, a secondary cell network device, a small cell network device, an evolved/enhanced NodeB (eNB), or any other network device (e.g. a user equipment, pico cell, Femto cell or the like). In some embodiments, the cell network device 2400 can include application circuitry 2402, baseband circuitry 2404, Radio Frequency (RF) circuitry 2406, front-end module (FEM) circuitry 2408 and one or more antennas 2410, coupled together at least as shown.

The application circuitry 2402 can include one or more application processors. For example, the application circuitry 2402 can include circuitry such as, but not limited to, one or more single-core or multi-core processors. The processor(s) can include any combination of general-purpose processors and dedicated processors (e.g., graphics processors, application processors, etc.). The processors can be coupled with and/or can include memory/storage and can be configured to execute instructions stored in the memory/storage to enable various applications and/or operating systems to run on the system.

The baseband circuitry 2404 can include circuitry such as, but not limited to, one or more single-core or multi-core processors. The baseband circuitry 2404 can include one or more baseband processors and/or control logic to process baseband signals received from a receive signal path of the RF circuitry 2406 and to generate baseband signals for a transmit signal path of the RF circuitry 2406. Baseband processing circuitry 2404 can interface with the application circuitry 2402 for generation and processing of the baseband signals and for controlling operations of the RF circuitry 2406. For example, in some embodiments, the baseband circuitry 2404 can include a second generation (2G) baseband processor 2404a, third generation (3G) baseband processor 2404b, fourth generation (4G) baseband processor 2404c, and/or other baseband processor(s) 2404d for other existing generations, generations in development or to be developed in the future (e.g., fifth generation (5G), 6G, etc.). The baseband circuitry 2404 (e.g., one or more of baseband processors 2404a-d) can handle various radio control functions that enable communication with one or more radio networks via the RF circuitry 2406. The radio control functions can include, but are not limited to, signal modulation/demodulation, encoding/decoding, radio frequency shifting, etc. In some embodiments, modulation/demodulation circuitry of the baseband circuitry 2404 can include Fast-Fourier Transform (FFT), precoding, and/or constellation mapping/demapping functionality. In some embodiments, encoding/decoding circuitry of the baseband circuitry 2404 can include convolution, tail-biting convolution, turbo, Viterbi, and/or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 2404 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 2404e of the baseband circuitry 2404 can be configured to run elements of the protocol stack for signaling of the PHY, MAC, RLC, PDCP and/or RRC layers. In some embodiments, the baseband circuitry can include one or more audio digital signal processor(s) (DSP) 2404f. The audio DSP(s) 2404f can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 2404 and the application circuitry 2402 can be implemented together such as, for example, on a system on a chip (SOC).

In some embodiments, the baseband circuitry 2404 can provide for communication compatible with one or more radio technologies. For example, in some embodiments, the baseband circuitry 2404 can support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 2404 is configured to support radio communications of more than one wireless protocol can be referred to as multi-mode baseband circuitry.

RF circuitry 2406 can enable communication with wireless networks using modulated electromagnetic radiation through a non-solid medium. In various embodiments, the RF circuitry 2406 can include switches, filters, amplifiers, etc. to facilitate the communication with the wireless network. RF circuitry 2406 can include a receive signal path which can include circuitry to down-convert RF signals received from the FEM circuitry 2408 and provide baseband signals to the baseband circuitry 2404. RF circuitry 2406 can also include a transmit signal path which can include circuitry to up-convert baseband signals provided by the baseband circuitry 2404 and provide RF output signals to the FEM circuitry 2408 for transmission.

In some embodiments, the RF circuitry 2406 can include a receive signal path and a transmit signal path. The receive signal path of the RF circuitry 2406 can include mixer circuitry 2406a, amplifier circuitry 2406b and filter circuitry 2406c. The transmit signal path of the RF circuitry 2406 can include filter circuitry 2406c and mixer circuitry 2406a. RF circuitry 2406 can also include synthesizer circuitry 2406d for synthesizing a frequency for use by the mixer circuitry 2406a of the receive signal path and the transmit signal path. In some embodiments, the mixer circuitry 2406a of the receive signal path can be configured to down-convert RF signals received from the FEM circuitry 2408 based on the synthesized frequency provided by synthesizer circuitry 2406d. The amplifier circuitry 2406b can be configured to amplify the down-converted signals and the filter circuitry 2406c can be a low-pass filter (LPF) or band-pass filter (BPF) configured to remove unwanted signals from the down-converted signals to generate output baseband signals. Output baseband signals can be provided to the baseband circuitry 2404 for further processing. In some embodiments, the output baseband signals can be zero-frequency baseband signals, although this is not a requirement. In some embodiments, mixer circuitry 2406a of the receive signal path can comprise passive mixers, although the scope of the embodiments is not limited in this respect.

In some embodiments, the mixer circuitry 2406a of the transmit signal path can be configured to up-convert input baseband signals based on the synthesized frequency provided by the synthesizer circuitry 2406d to generate RF output signals for the FEM circuitry 2408. The baseband signals can be provided by the baseband circuitry 2404 and can be filtered by filter circuitry 2406c. The filter circuitry 2406c can include a low-pass filter (LPF), although the scope of the embodiments is not limited in this respect.

In some embodiments, the mixer circuitry 2406a of the receive signal path and the mixer circuitry 2406a of the transmit signal path can include two or more mixers and can be arranged for quadrature down-conversion or up-conversion respectively. In some embodiments, the mixer circuitry 2406a of the receive signal path and the mixer circuitry 2406a of the transmit signal path can include two or more mixers and can be arranged for image rejection (e.g., Hartley image rejection). In some embodiments, the mixer circuitry 2406a of the receive signal path and the mixer circuitry 2406a can be arranged for direct down-conversion or direct up-conversion, respectively. In some embodiments, the mixer circuitry 2406a of the receive signal path and the mixer circuitry 2406a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 2406 can include analog-to-digital converter (ADC) and digital-to-analog converter (DAC) circuitry and the baseband circuitry 2404 can include a digital baseband interface to communicate with the RF circuitry 2406.

In some dual-mode embodiments, a separate radio IC circuitry can be provided for processing signals for each spectrum, although the scope of the embodiments is not limited in this respect.

In some embodiments, the synthesizer circuitry 2406d can be a fractional-N synthesizer or a fractional N/N+24 synthesizer, although the scope of the embodiments is not limited in this respect as other types of frequency synthesizers can be suitable. For example, synthesizer circuitry 2406*d* can be a delta-sigma synthesizer, a frequency multiplier, or a synthesizer comprising a phase-locked loop with a frequency divider.

The synthesizer circuitry 2406*d* can be configured to synthesize an output frequency for use by the mixer circuitry 2406*a* of the RF circuitry 2406 based on a frequency input and a divider control input. In some embodiments, the synthesizer circuitry 2406*d* can be a fractional N/N+24 synthesizer.

In some embodiments, frequency input can be provided by a voltage controlled oscillator (VCO), although that is not a requirement. Divider control input can be provided by either the baseband circuitry 2404 or the applications processor 2402 depending on the desired output frequency. In some embodiments, a divider control input (e.g., N) can be determined from a look-up table based on a channel indicated by the applications processor 2402.

Synthesizer circuitry 2406*d* of the RF circuitry 2406 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+24 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 2406*d* can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 2406 can include an IQ/polar converter.

FEM circuitry 2408 can include a receive signal path which can include circuitry configured to operate on RF signals received from one or more antennas 2410, amplify the received signals and provide the amplified versions of the received signals to the RF circuitry 2406 for further processing. FEM circuitry 2408 can also include a transmit signal path which can include circuitry configured to amplify signals for transmission provided by the RF circuitry 2406 for transmission by one or more of the one or more antennas 2410.

In some embodiments, the FEM circuitry 2408 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 2406). The transmit signal path of the FEM circuitry 2408 can include a power amplifier (PA) to amplify input RF signals (e.g., provided by RF circuitry 2406), and one or more filters to generate RF signals for subsequent transmission (e.g., by one or more of the one or more antennas 2410.

In some embodiments, the cell network device 2400 can include additional elements such as, for example, memory/storage, display, camera, sensor, and/or input/output (I/O) interface. In some embodiments, the electronic device of FIG. 24 may be configured to perform one or more processes, techniques, and/or methods as described herein, or portions thereof.

In various embodiments herein, a system can be a mobile computing device such as, but not limited to, a laptop computing device, a tablet computing device, a netbook, an ultrabook, a smartphone, etc. In various embodiments, system can have more or less components, and/or different architectures. For example, in some embodiments the RF logic and/or the baseband logic can be embodied in communication logic (not shown). The communication logic can include one or more single-core or multi-core processors and logic circuits to provide signal processing techniques, for example, encoding, modulation, filtering, converting, amplifying, etc., suitable to the appropriate communication interface over which communications will take place. The communication logic can communicate over wireline, optical, or wireless communication mediums. In embodiments in which the system is configured for wireless communication, the communication logic can include the RF logic and/or baseband logic to provide for communication compatible with one or more radio technologies. For example, in some embodiments, the communication logic can support communication with an evolved universal terrestrial radio access network (EUTRAN) and/or other wireless metropolitan area networks (WMAN), a wireless local area network (WLAN), a wireless personal area network (WPAN).

Embodiments herein can be described as related to the third generation partnership project (3GPP) long term evolution (LTE) or LTE-advanced (LTE-A) standards. For example, terms or entities such as eNodeB (eNB), mobility management entity (MME), user equipment (UE), etc. may be used that may be viewed as LTE-related terms or entities. However, in other embodiments the technology may be used in or related to other wireless technologies such as the Institute of Electrical and Electronic Engineers (IEEE) 802.16 wireless technology (WiMax), IEEE 802.11 wireless technology (WiFi), various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed. In those embodiments, where LTE-related terms such as eNB, MME, UE, etc. are used, one or more entities or components may be used that may be considered to be equivalent or approximately equivalent to one or more of the LTE-based terms or entities.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, nonvolatile memory, disk storage, and memory storage. Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus of, for or employed by an evolved NodeB (eNB) comprising: a processing component configured to identify a measurement gap pattern to facilitate measurement gap measurements based on one or more different component carriers (CCs) for carrier aggregation; and a communication component, communicatively coupled to the processing component, configured to communicate the measurement gap pattern via one or more radio resource control (RRC) signals.

Example 2 includes the subject matter of Example 1, wherein the processing component is further configured to identify user equipment (UE) capabilities associated with the one or more different CCs and generate the measurement gap pattern based on an association of the one or more different CCs with the UE capabilities.

Example 3 includes the subject matter of any one of Examples 1-2, including or omitting optional elements, wherein the processing component is further configured to identify at least one of: a gap offset that includes information for a selection of a gap repetition period, or a supporting CC data set that indicates a first set of CCs to be measured utilizing the gap repetition period that is different from another gap repetition period associated with a second set of CCs.

Example 4 includes the subject matter of any one of Examples 1-3, including or omitting optional elements, wherein the communication component is further configured to receive a supporting CC data set comprising UE capabilities related to the one or more CCs and communicate a re-configuration of the measurement gap pattern, and the processing component is configured to generate the re-configuration of the measurement gap pattern as a different measurement gap pattern based on the supporting CC data set.

Example 5 includes the subject matter of any one of Examples 1-4, including or omitting optional elements, wherein the supporting CC data set comprises a plurality of different CCs that are supported by the UE capabilities and indications associated with different CCs of the plurality of different CCs that indicate requests for at least one of a measurement gap of the measurement gap pattern or for a continued downlink of data without the measurement gap.

Example 6 includes the subject matter of any one of Examples 1-5, including or omitting optional elements, wherein the supporting CC data set comprises a plurality of different CCs that are supported by the UE capabilities and indications associated with the plurality of different CCs that indicate requests for at least one of: a selection among different gap repetition periods or for a continued downlink of data without a measurement gap.

Example 7 includes the subject matter of any one of Examples 1-6, including or omitting optional elements, wherein the supporting CC data set comprises a plurality of different CCs that are supported by the UE capabilities and indications associated with the plurality of different CCs that indicate requests for at least one of a different measurement gap pattern associated with different sets of CCs of the plurality of different CCs or a continued downlink of data without a measurement gap.

Example 8 includes the subject matter of any one of Examples 1-7, including or omitting optional elements, wherein the supporting CC data set comprises a plurality of different CC groups comprising one or more different CCs as members of the plurality of different CC groups that are supported by the UE capabilities and indications associated with the plurality of different CC groups that indicate requests for different measurement gap patterns associated with different sets of CC groups of the plurality of different CC groups or for a continued downlink of data without a measurement gap.

Example 9 includes the subject matter of any one of Examples 1-8, including or omitting optional elements, wherein the processing component is further configured to identify a gap offset, a gap repetition period, a miniGap indicator and identify at least one serving band that designates a UE serving band based on one or more UE capabilities, wherein the UE capabilities comprise at least one of a plurality of component carriers covered by one or more radio frequency (RF) chains of a UE.

Example 10 is an apparatus of, for or employed by a user equipment (UE) comprising: a communication component, comprising one or more communication chains corresponding to one or more component carriers (CCs), configured to process one or more radio resource control (RRC) signals to a receive or transmit path; and a processor component, communicatively coupled to the communication component, configured to process the one or more radio resource control (RRC) signals to determine a measurement gap configuration of a measurement gap pattern that controls measurements during measurement gaps based on a set of UE capabilities comprising the one or more component carriers (CCs) and the one or more communication chains.

Example 11 includes the subject matter of Example 10, wherein the processor component is further configured to generate a selection of a different measurement gap pattern of a plurality of measurement gap patterns based on the set of UE capabilities, and wherein the communication component is further configured to respond to the one or more RRC signals by generating the selection to the receive or transmit path, and receive a downlink transmission with one or more data based on the selection to re-configure the measurement gap pattern.

Example 12 includes the subject matter of any one of Examples 10-11, including or omitting optional elements, wherein processor component is further configured to generate indications of a gap offset of a gap repetition period associated with different communication chains and the one or more CCs.

Example 13 includes the subject matter of any one of Examples 10-12, including or omitting optional elements, wherein, in response to the RRC signals, the communication component is further configured to communicate the indications to the receive or transmit path and, in response to communicating the indications, receive a downlink transmission that enables a re-configuration of the measurement gap pattern.

Example 14 includes the subject matter of any one of Examples 10-13, including or omitting optional elements, wherein the processor component is further configured to generate a supporting CC data set comprising the UE capabilities associated with different CCs and indications associated with the different CCs that indicate whether a measurement gap is requested according to different communication chains of the communication component, respectively.

Example 15 includes the subject matter of any one of Examples 10-14, including or omitting optional elements, wherein the processor component is further configured to generate a supporting CC data set comprising the UE capabilities associated with different CCs and indications associated with the different CCs that indicate CC combinations associated with communication chains of the communication component and selections of at least one of a minigap, a long gap or a no gap for the CC combinations.

Example 16 includes the subject matter of any one of Examples 10-15, including or omitting optional elements, wherein the processor component is further configured to generate a supporting CC data set comprising combinations of different CCs corresponding to both the UE capabilities and selections of different measurement gap patterns of measurement gap configurations based on the UE capabilities.

Example 17 includes the subject matter of any one of Examples 10-16, including or omitting optional elements, wherein the processor component is further configured to generate a supporting CC data set with different CC groups comprising different CCs and corresponding different measurement gap patterns.

Example 18 includes the subject matter of any one of Examples 10-17, including or omitting optional elements, wherein the communication component is further configured to communicate to an evolved NodeB which of the one or more communication chains are configured to receive a continuous data downlink without a measurement gap.

Example 19 is a computer-readable medium comprising executable instructions that, in response to execution, cause one or more processors of a network device comprising an evolved NodeB or a user equipment to perform operations, the operations comprising: generating, via the one or more processors of the network device, an indication of a measurement gap pattern that corresponds to one or more different communication chains with different UE capabilities based on different component carriers (CCs); and communicating, via a communication component of the network device, the indication of the measurement gap pattern.

Example 20 includes the subject matter of Example 19, wherein the operations further comprise: identifying at least one of a gap offset that includes information for a choice of different gap repetition periods corresponding to the different CCs and a supporting CC data set comprising a first set of CCs to be measured by a first communication chain of the one or more different communication chains, and a second set of CCs to be measured by a second communication chain of the one or more different communication chains, and indications of whether a mini gap or a full gap that is larger than the mini gap is to be utilized for a downlink transmission by the first communication chain and the second communication chain.

Example 21 includes the subject matter of any one of Examples 19-20, including or omitting optional elements, wherein the operations further comprise: processing or generating a response for a reconfiguration of the measurement gap pattern based on a supporting CC data set, wherein the supporting CC data set comprises first correlations of the different CCs with the one or more different communication chains based on the UE capabilities, and second correlations of different measurement gap patterns with the different CCs.

Example 22 includes the subject matter of any one of Examples 19-21, including or omitting optional elements, wherein the operations further comprise: facilitating a change of the measurement gap pattern based on the UE capabilities and a supporting CC data set within a communication from a UE in response to a transmission of the measurement gap pattern via one or more radio resource control (RRC) signals.

Example 23 includes the subject matter of any one of Examples 19-22, including or omitting optional elements, wherein the supporting CC data set comprises CC groups comprising different sets of CCs and which of measurement gap patterns correspond to which CCs of the CC groups.

Example 24 includes the subject matter of any one of Examples 19-23, including or omitting optional elements, wherein the supporting CC data set further comprises an first set of indications of whether a gap is requested and a second set of indications of a gap offset that includes information of a gap repetition period, according to the one or more different communication chains.

Example 25 is an apparatus employed by an evolved NodeB or a user equipment (UE) comprising: means for generating an indication of a measurement gap pattern that corresponds to one or more different communication chains with different UE capabilities based on different component carriers (CCs); and means for communicating the indication of the measurement gap pattern.

Example 26 includes the subject matter of Example 25, including or omitting optional elements, further comprising: means for identifying at least one of a gap offset that includes information for a choice of different gap repetition periods corresponding to the different CCs and a supporting CC data set comprising a first set of CCs to be measured by a first communication chain of the one or more different communication chains, and a second set of CCs to be measured by a second communication chain of the one or more different communication chains, and indications of whether a mini gap or a full gap that is larger than the mini gap is to be utilized for a downlink transmission by the first communication chain and the second communication chain.

Example 27 includes the subject matter of any one of Examples 25-26, including or omitting optional elements, wherein the operations further comprise: processing or generating a response for a reconfiguration of the measurement gap pattern based on a supporting CC data set, wherein the supporting CC data set comprises first correlations of the different CCs with the one or more different communication chains based on the UE capabilities, and second correlations of different measurement gap patterns with the different CCs.

Example 28 includes the subject matter of any one of Examples 25-27, including or omitting optional elements, wherein the operations further comprise: facilitating a change of the measurement gap pattern based on the UE capabilities and a supporting CC data set within a communication from a UE in response to a transmission of the measurement gap pattern via one or more radio resource control (RRC) signals.

Example 29 includes the subject matter of any one of Examples 25-28, including or omitting optional elements, wherein the supporting CC data set comprises CC groups comprising different sets of CCs and which of measurement gap patterns correspond to which CCs of the CC groups.

Example 30 includes the subject matter of any one of Examples 25-29, including or omitting optional elements, wherein the supporting CC data set further comprises an first set of indications of whether a gap is requested and a second set of indications of a gap offset that includes information of a gap repetition period, according to the one or more different communication chains.

Example 31 is an apparatus of an evolved NodeB comprising: a processor configured to: identify a measurement gap pattern to facilitate measurement gap measurements based on one or more different component carriers (CCs) for carrier aggregation; and communicate the measurement gap pattern via one or more radio resource control (RRC) signals.

Example 32 is an apparatus for a user equipment comprising: a processor configured to: process one or more radio resource control (RRC) signals to a receive or transmit path; and process the one or more radio resource control (RRC) signals to determine a measurement gap configuration of a measurement gap pattern that controls measurements during measurement gaps based on a set of UE capabilities comprising the one or more component carriers (CCs) and the one or more communication chains.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDML, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. An apparatus of an evolved NodeB (eNB) comprising: one or more processors configured to:
identify a measurement gap pattern to facilitate measurement gap measurements based on one or more different component carriers (CCs) for carrier aggregation; and
a radio frequency (RF) circuitry, communicatively coupled to the one or more processors, configured to communicate the measurement gap pattern via one or more radio resource control (RRC) signals, wherein the RF circuitry is further configured to receive a supporting CC data set comprising UE capabilities related to the one or more CCs and communicate a re-configuration of the measurement gap pattern, and the one or more processors are further configured to generate the re-configuration of the measurement gap pattern as a different measurement gap pattern based on the supporting CC data set, wherein the supporting CC data set comprises a plurality of different CCs that are supported by the UE capabilities and indications associated with different CCs of the plurality of different CCs that indicate requests for at least one of a measurement gap of the measurement gap pattern or a continued downlink of data without the measurement gap.

2. The apparatus of claim 1, wherein the one or more processors are further configured to identify user equipment (UE) capabilities associated with the one or more different CCs and generate the measurement gap pattern based on an association of the one or more different CCs with the UE capabilities.

3. The apparatus of claim 1, wherein the one or more processors are further configured to identify at least one of: a gap offset that includes information for a selection of a gap repetition period, or a supporting CC data set that indicates a first set of CCs to be measured utilizing the gap repetition period that is different from another gap repetition period associated with a second set of CCs.

4. The apparatus of claim 1, wherein the supporting CC data set comprises the plurality of different CCs that are supported by the UE capabilities and indications associated with the plurality of different CCs that indicate the requests for a selection among different gap repetition periods.

5. The apparatus of claim 1, wherein the supporting CC data set comprises the plurality of different CCs that are supported by the UE capabilities and indications associated with the plurality of different CCs that indicate the requests for a different measurement gap pattern associated with different sets of CCs of the plurality of different CCs.

6. The apparatus of claim 1, wherein the supporting CC data set comprises the plurality of different CC groups comprising one or more different CCs as members of the plurality of different CC groups that are supported by the UE capabilities and indications associated with the plurality of different CC groups that indicate the requests for different measurement gap patterns associated with different sets of CC groups of the plurality of different CC groups.

7. The apparatus of claim 1, wherein the one or more processors are further configured to identify a gap offset, a gap repetition period, a miniGap indicator and identify at least one serving band that designates a UE serving band based on the UE capabilities, wherein the UE capabilities comprise at least one of a plurality of component carriers covered by one or more radio frequency (RF) chains of a UE.

8. An apparatus for a user equipment (UE) comprising:
radio frequency (RF) circuitry, comprising one or more communication chains corresponding to one or more component carriers (CCs), configured to process one or more radio resource control (RRC) signals to a receive or transmit path; and
one or more processors, communicatively coupled to the RF circuitry, configured to process the one or more radio resource control (RRC) signals to determine a measurement gap configuration of a measurement gap pattern that controls measurements during measurement gaps based on a set of UE capabilities comprising the one or more component carriers (CCs) and the one or more communication chains,
wherein the one or more processors are further configured to generate a selection of a different measurement gap pattern of a plurality of measurement gap patterns based on the set of UE capabilities and generate a supporting CC data set comprising combinations of different CCs corresponding to both the UE capabilities and selections of different measurement gap patterns of measurement gap configurations based on the UE capabilities, and wherein the RF circuitry is further configured to respond to the one or more RRC signals by generating the selection to the receive or transmit path, and receive a downlink transmission with one or more data based on the selection to re-configure the measurement gap pattern.

9. The apparatus of claim 8, wherein the one or more processors are further configured to generate indications of a gap offset of a gap repetition period associated with different communication chains and the one or more CCs.

10. The apparatus of claim 9, wherein, in response to the RRC signals, the RF circuitry is further configured to communicate the indications to the receive or transmit path and, in response to communicating the indications, receive the downlink transmission that enables a re-configuration of the measurement gap pattern.

11. The apparatus of claim 8, wherein the one or more processors are further configured to generate a supporting CC data set comprising the UE capabilities associated with the different CCs and indications associated with the different CCs that indicate whether a measurement gap is requested according to different communication chains of the RF circuitry, respectively.

12. The apparatus of claim 8, wherein the one or more processors are further configured to generate a supporting CC data set comprising the UE capabilities associated with the different CCs and indications associated with the different CCs that indicate CC combinations associated with communication chains of the RF circuitry and selections of at least one of a minigap, a long gap or a no gap for the CC combinations.

13. The apparatus of claim 8, wherein the one or more processors are further configured to generate the supporting CC data set with the different CC groups comprising different CCs and corresponding different measurement gap patterns.

14. The apparatus of claim 8, wherein the RF circuitry is further configured to communicate to an evolved NodeB which of the one or more communication chains are configured to receive a continuous data downlink without a measurement gap.

15. A non-transitory computer-readable medium comprising executable instructions that, in response to execution, cause one or more processors of a network device comprising an evolved NodeB or a user equipment (UE) to perform operations, the operations comprising:
generating, via the one or more processors of the network device, an indication of a measurement gap pattern that corresponds to one or more different communication chains with different UE capabilities based on different component carriers (CCs);
communicating, via a radio frequency (RF) circuitry of the network device, the indication of the measurement gap pattern; and
facilitating a change of the measurement gap pattern based on the UE capabilities and a supporting CC data set within a communication from a UE in response to a transmission of the measurement gap pattern via one or more radio resource control (RRC) signals, wherein the supporting CC data set comprises CC groups comprising different sets of CCs and which of measurement gap patterns correspond to which CCs of the CC groups.

16. The non-transitory computer-readable medium of claim 15, wherein the operations further comprise:
identifying at least one of a gap offset that includes information for a choice of different gap repetition periods corresponding to the different CCs and the supporting CC data set comprising a first set of CCs to be measured by a first communication chain of the one or more different communication chains, and a second set of CCs to be measured by a second communication chain of the one or more different communication chains, and indications of whether a mini gap or a full gap that is larger than the mini gap is to be utilized for a downlink transmission by the first communication chain and the second communication chain.

17. The non-transitory computer-readable medium of claim 15, wherein the operations further comprise:
processing or generating a response for a reconfiguration of the measurement gap pattern based on the supporting CC data set, wherein the supporting CC data set comprises first correlations of the different CCs with the one or more different communication chains based on the UE capabilities, and second correlations of different measurement gap patterns with the different CCs.

18. The non-transitory computer-readable medium of claim 15, wherein the supporting CC data set further comprises a first set of indications of whether a gap is requested and a second set of indications of a gap offset that includes information of a gap repetition period, according to the one or more different communication chains.

* * * * *